(12) United States Patent
Singh et al.

(10) Patent No.: US 12,561,518 B2
(45) Date of Patent: Feb. 24, 2026

(54) EXAMPLE-BASED AUTOGENERATED DATA PROCESSING RULES

(71) Applicant: Microsoft Technology Licensing, LLC, Redmond, WA (US)

(72) Inventors: Mukul Singh, Delhi (IN); José Pablo Cambronero Sánchez, New Haven, CT (US); Sumit Gulwani, Sammamish, WA (US); Vu Minh Le, Redmond, WA (US); Carina Suzana Negreanu, Cambridge (GB); Mohammad Raza, Sammamish, WA (US); Daniel Galen Simmons, Carnation, WA (US); Gust Ben Anneloes Verbruggen, Keerbergen (BE)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 18/075,497

(22) Filed: Dec. 6, 2022

(65) Prior Publication Data

US 2024/0184979 A1    Jun. 6, 2024

(51) Int. Cl.
G06F 40/18        (2020.01)
G06F 16/355        (2025.01)
(Continued)

(52) U.S. Cl.
CPC ............ G06F 40/18 (2020.01); G06F 16/355 (2019.01); G06F 40/103 (2020.01); G06N 5/025 (2013.01)

(58) Field of Classification Search
CPC ........ G06F 40/18; G06F 40/103; G06N 5/025
See application file for complete search history.

(56) References Cited

U.S. PATENT DOCUMENTS

| | | | | |
|---|---|---|---|---|
| 5,613,131 A | * | 3/1997 | Moss | G06F 40/18 |
| | | | | 715/236 |
| 8,161,028 B2 | * | 4/2012 | Hu | G06F 16/355 |
| | | | | 707/738 |

(Continued)

FOREIGN PATENT DOCUMENTS

| | | | | |
|---|---|---|---|---|
| WO | WO-2020131409 A1 | * | 6/2020 | G06F 40/103 |

OTHER PUBLICATIONS

Enrico Fini et. al.; "Semi-supervised learning made simple with self-supervised clustering", Proceedings of the IEEE/CVF Conference on Computer Vision and Pattern Recognition (2023) 3187-3197, https://doi.org/10.48550/arXiv.2306.07483 (Year: 2023).*

(Continued)

*Primary Examiner* — Benjamin Smith
(74) *Attorney, Agent, or Firm* — Wade IP Law PLLC

(57) ABSTRACT

Some embodiments automatically generate data processing rules based on positive examples of processed data, e.g., formatting rules based on formatted data, filtering rules based on filtered data, or validating rules based on valid data. Some embodiments also use negative examples, e.g., unformatted data. A machine learning rule generation architecture includes a predicate generator, a cell cluster creator, a rule enumerator, and in some versions a rule ranker. Formatting rules written by a user are replaced by simpler autogenerated rules. Spreadsheet formatting rule functionality is enhanced, and surfaced in a user interface.

20 Claims, 8 Drawing Sheets

(51) Int. Cl.
    G06F 40/103     (2020.01)
    G06N 5/025      (2023.01)

(56)                References Cited

U.S. PATENT DOCUMENTS

| 8,166,000 | B2* | 4/2012 | Labrie | G06F 16/215 |
| | | | | 707/694 |
| 8,181,104 | B1* | 5/2012 | Helfand | G06F 40/143 |
| | | | | 715/236 |
| 8,484,550 | B2* | 7/2013 | Gulwani | G06F 40/18 |
| | | | | 715/217 |
| 9,037,959 | B2* | 5/2015 | Rapp | G06F 40/18 |
| | | | | 715/212 |
| 9,152,627 | B2* | 10/2015 | Kung | G06F 16/2365 |
| 9,411,781 | B2* | 8/2016 | Prasad | G06F 40/117 |
| 9,430,459 | B2* | 8/2016 | Gulwani | G06F 40/177 |
| 9,519,622 | B2* | 12/2016 | Sun | G06F 40/30 |
| 9,916,286 | B2* | 3/2018 | Sun | G06F 40/16 |
| 10,025,561 | B2* | 7/2018 | Seshadri | G06F 8/30 |
| 10,102,241 | B2* | 10/2018 | Zorn | G06F 16/252 |
| 10,108,597 | B2* | 10/2018 | Gulwani | G06F 40/177 |
| 10,133,715 | B2* | 11/2018 | Kikin-Gil | G06F 40/106 |
| 10,241,974 | B2* | 3/2019 | Sun | G06F 40/16 |
| 10,255,248 | B2* | 4/2019 | Sun | G06F 40/16 |
| 10,332,010 | B2* | 6/2019 | Yan | G06N 5/025 |
| 10,409,892 | B2* | 9/2019 | Rothschiller | G06F 40/103 |
| 10,594,757 | B1* | 3/2020 | Shevchenko | G06F 17/18 |
| 10,764,534 | B1* | 9/2020 | Shevchenko | G10L 15/197 |
| 10,771,529 | B1* | 9/2020 | Shevchenko | G06F 9/453 |
| 10,877,633 | B2* | 12/2020 | Boucher | G06F 40/166 |
| 10,983,670 | B2* | 4/2021 | Boucher | G06F 16/2228 |
| 11,080,475 | B2* | 8/2021 | Singh | G06F 40/18 |
| 11,093,711 | B2* | 8/2021 | Iida | G06F 18/23213 |
| 11,245,766 | B1* | 2/2022 | Patodia | H04L 67/51 |
| 11,256,710 | B2* | 2/2022 | Gulwani | G06F 16/258 |
| 11,334,323 | B1* | 5/2022 | Hatfield | G06F 40/216 |
| 11,341,322 | B2* | 5/2022 | Dong | G06F 40/18 |
| 11,556,703 | B2* | 1/2023 | Dong | G06F 40/18 |
| 11,593,408 | B2* | 2/2023 | Komninos | G06F 16/283 |
| 11,663,482 | B2* | 5/2023 | Ittycheriah | G06V 30/413 |
| | | | | 715/231 |
| 11,743,337 | B2* | 8/2023 | Patodia | H04L 67/34 |
| | | | | 709/224 |
| 11,810,381 | B2* | 11/2023 | Gangadhar | G06V 30/413 |
| 11,989,503 | B2* | 5/2024 | Murphy | G06F 40/274 |
| 12,086,532 | B2* | 9/2024 | Gorman | G06F 40/205 |
| 2003/0009649 | A1* | 1/2003 | Martin | G06F 40/18 |
| | | | | 712/1 |
| 2009/0006283 | A1* | 1/2009 | Labrie | G06F 16/215 |
| | | | | 706/12 |
| 2009/0292987 | A1* | 11/2009 | Sorenson | G06F 40/103 |
| | | | | 715/255 |
| 2010/0145961 | A1* | 6/2010 | Hu | G06F 16/355 |
| | | | | 707/758 |
| 2012/0192051 | A1* | 7/2012 | Rothschiller | G06F 16/26 |
| | | | | 715/217 |
| 2012/0198322 | A1* | 8/2012 | Gulwani | G06F 40/177 |
| | | | | 715/212 |
| 2013/0166515 | A1* | 6/2013 | Kung | G06Q 10/063 |
| | | | | 707/690 |
| 2013/0275847 | A1* | 10/2013 | Gulwani | G06F 40/177 |
| | | | | 715/217 |
| 2014/0040730 | A1* | 2/2014 | Prasad | G06F 40/103 |
| | | | | 715/249 |
| 2014/0081931 | A1* | 3/2014 | Kung | G06F 16/2365 |
| | | | | 707/694 |
| 2016/0224321 | A1* | 8/2016 | Seshadri | G06F 8/61 |
| 2016/0350276 | A1* | 12/2016 | Gulwani | G06F 40/177 |
| 2017/0315967 | A1* | 11/2017 | Boucher | G06F 40/174 |
| 2017/0315979 | A1* | 11/2017 | Boucher | G06Q 10/101 |
| 2017/0337238 | A1* | 11/2017 | Zorn | G06F 40/18 |
| 2018/0089164 | A1* | 3/2018 | Iida | G06N 5/022 |
| 2018/0113873 | A1* | 4/2018 | Gulwani | G06F 40/16 |
| 2018/0203836 | A1* | 7/2018 | Singh | G06F 40/18 |

| 2019/0347268 | A1* | 11/2019 | Griffith | G06F 16/258 |
| 2021/0142329 | A1* | 5/2021 | Aparício | G06N 5/025 |
| 2021/0149926 | A1* | 5/2021 | Komninos | G06F 16/283 |
| 2021/0209297 | A1* | 7/2021 | Dong | G06F 40/106 |
| 2021/0342517 | A1* | 11/2021 | Ittycheriah | G06F 40/30 |
| 2021/0406771 | A1* | 12/2021 | Basak | G06Q 40/06 |
| 2022/0027740 | A1* | 1/2022 | Dong | G06F 40/30 |
| 2022/0156047 | A1* | 5/2022 | Hatfield | G06F 16/986 |
| 2022/0229974 | A1* | 7/2022 | Murphy | G06F 40/237 |
| 2022/0343062 | A1* | 10/2022 | Dong | G06F 40/106 |
| 2022/0398397 | A1* | 12/2022 | Gangadhar | G06F 18/24765 |
| 2023/0123328 | A1* | 4/2023 | Gorman | G06F 40/289 |
| | | | | 715/256 |
| 2023/0214586 | A1* | 7/2023 | Hudock | G06F 40/186 |
| | | | | 715/212 |
| 2023/0259766 | A1* | 8/2023 | Kasioumis | G06N 3/08 |
| | | | | 706/25 |
| 2023/0259781 | A1* | 8/2023 | Ittycheriah | G06N 3/084 |
| | | | | 715/231 |
| 2023/0325590 | A1* | 10/2023 | Shevchenko | G06N 5/04 |
| | | | | 715/200 |
| 2023/0418881 | A1* | 12/2023 | Guo | G06F 40/103 |
| 2024/0015224 | A1* | 1/2024 | Patodia | H04L 67/125 |

OTHER PUBLICATIONS

Xinyun Chen et. al.; "SpreadsheetCoder: Formula Prediction from Semi-structured Context"; 2021; 14 pages; https://arxiv.org/abs/2106.15339 (Year: 2021).*

Haoyu Dong et al., 2020. Neural Formatting for Spreadsheet Tables. In Proceedings of the 29th ACM International Conference on Information & Knowledge Management (CIKM '20). Association for Computing Machinery, New York, NY, USA, 305-314. https://doi.org/10.1145/3340531.3411943 (Year: 2020).*

Vu Le and Sumit Gulwani. 2014. FlashExtract: a framework for data extraction by examples. SIGPLAN Not. 49, 6 (Jun. 2014), 542-553. https://doi.org/10.1145/2666356.2594333 (Year: 2014).*

D. Li, H. Wang, C. Xu, F. Shi, X. Ma, "WARDER: Refining Cell Clustering for Effective Spreadsheet Defect Detection via Validity Properties," 2019 IEEE 19th International Conference on Software Quality, Reliability and Security (QRS), Sofia, Bulgaria, 2019, pp. 139-150, doi: 10.1109/QRS.2019.00030 (Year: 2019).*

Abramovich, S.; Sugden, S.; Abramovich, S.; and Sugden, S. J. 2004. Spreadsheet Conditional Formatting: An Untapped Resource for Mathematics Education. Spreadsheets in Education, 85105, 24 pages, no later than Dec. 31, 2005.

Barik, T.; Lubick, K.; Smith, J.; Slankas, J.; and Murphy-Hill, E. 2015. Fuse: a reproducible, extendable, internet-scale corpus of spreadsheets. In 2015 IEEE/ACM 12th Working Conference on Mining Software Repositories, 486-489. IEEE. 4 pages, no later than Dec. 31, 2015.

Blockeel, H.; and De Raedt, L. 1998. Top-down induction of first-order logical decision trees. Artificial intelligence, 101 (1-2): 285-297, 13 pages, no later than Dec. 31, 1998.

Cropper, A.; and Morel, R. 2020. Learning programs by learning from failures. CoRR, abs/2005.02259, 56 pages, no later than Dec. 31, 2020.

Devlin, J.; Chang, M.-W.; Lee, K.; and Toutanova, K. 2019. BERT: Pre-training of Deep Bidirectional Transformers for Language Understanding. ArXiv, abs/1810.04805, 16 pages, no later than Dec. 31, 2019.

Dong, H.; Wang, J.; Fu, Z.; Han, S.; and Zhang, D. 2020. Neural Formatting for Spreadsheet Tables. In Proceedings of the 29th ACM International Conference on Information & Knowledge Management, CIKM '20, 305-314. New York, NY, USA: Association for Computing Machinery. ISBN 9781450368599, 10 pages, no later than Dec. 31, 2020.

Ellis, K.; and Gulwani, S. 2017. Learning to Learn Programs from Examples: Going Beyond Program Structure. In JCAI 2017., 8 pages, no later than Dec. 31, 2017.

Feng, Z.; Guo, D.; Tang, D.; Duan, N.; Feng, X.; Gong, M.; Shou, L.; Qin, B.; Liu, T.; Jiang, D.; and Zhou, M. 2020. CodeBERT: A

(56)　　　　　References Cited

OTHER PUBLICATIONS

Pre-Trained Model for Programming and Natural Languages. CoRR, abs/2002.08155, 12 pages, no later than Dec. 31, 2020.

Fisher, M.; and Rothermel, G. 2005. The EUSES spreadsheet corpus: a shared resource for supporting experimentation with spreadsheet dependability mechanisms. In Proceedings of the first workshop on End-user software engineering, 1-5, 5 pages, no later than Dec. 31, 2005.

Gulwani, S. 2011. Automating String Processing in Spreadsheets using Input-Output Examples. In PoPL'11, Jan. 26-28, 2011, Austin, Texas, USA, 13 pages, no later than Dec. 31, 2011.

Gulwani, S.; Le, V.; Radhakrishna, A.; Radicek, I.; and Raza, M. 2020. Structure interpretation of text formats. In Object-Oriented Programming, Systems, Languages & Applications (OOPSLA). ACM, 29 pages, no later than Dec. 31, 2020.

Herzig, J.; Nowak, P. K.; Muller, T.; Piccinno, F.; and Eisenschlos, J. M. 2020. Tapas: Weakly Supervised Table Parsing via Pre-training. In Proceedings of the 58th Annual Meeting of the Association for Computational Linguistics (vol. 1: Long Papers). Seattle, Washington, United States, 14 pages, no later than Dec. 31, 2020.

Hurst, N.; Marriott, K.; and Moulder, P. 2005. Toward tighter tables. In Proceedings of the 2005 ACM symposium on Document engineering, 74-83, 10 pages, no later than Dec. 31, 2005.

Kaufman, L.; and Rousseeuw, P. J. 2009. Finding groups in data: an introduction to cluster analysis. John Wiley & Sons, 30 pages, no later than Dec. 31, 2009.

Le, V.; and Gulwani, S. 2014. FlashExtract: a framework for data extraction by examples. In 2014 Programming Language Design and Implementation, 542-553. ACM, 12 pages, no later than Dec. 31, 2014.

Lee, K.-H.; Chen, X.; Hua, G.; Hu, H.; and He, X. 2018. Stacked Cross Attention for Image-Text Matching, 25 pages, no later than Dec. 31, 2018.

Liguori, P.; Al-Hossami, E.; Cotroneo, D.; Natella, R.; Cukic, B.; and Shaikh, S. 2022. CanWe Generate Shellcodes via Natural Language? An Empirical Study. CoRR, abs/2202.03755, 33 pages, no later than Dec. 31, 2022.

Lin, X. 2006. Active layout engine: Algorithms and applications in variable data printing. Computer-Aided Design, 38 (5): 444-456, 13 pages, no later than Dec. 31, 2006.

Natarajan, N.; Simmons, D.; Datha, N.; Jain, P.; and Gulwani, S. 2019. Learning Natural Programs from a Few Examples in Real-Time. In AIStats, 18 pages, no later than Dec. 31, 2019.

Odena, A.; Shi, K.; Bieber, D.; Singh, R.; and Sutton, C. 2021. BUSTLE: Bottom-up program-Synthesis Through Learning-guided Exploration. ArXiv, abs/2007.14381, 16 pages, no later than Dec. 31, 2021.

Padhi, S.; Jain, P.; Perelman, D.; Polozov, O.; Gulwani, S.; and Millstein, T. D. 2017. FlashProfile: Interactive Synthesis of Syntactic Profiles. CoRR, abs/1709.05725, 28 pages, no later than Dec. 31, 2017.

Poesia, G.; Polozov, O.; Le, V.; Tiwari, A.; Soares, G.; Meek, C.; and Gulwani, S. 2022. Synchromesh: Reliable code generation from pre-trained language models. CoRR, abs/2201.11227, 19 pages, Jan. 26, 2022.

Polozov, O.; and Gulwani, S. 2015. FlashMeta: A Framework for Inductive Program Synthesis. SIGPLAN Not., 50(10): 107-126, 20 pages, no later than Dec. 31, 2015.

Raggett, D.; Hors, A.; and Jacobs, I. 1999. HTML 4.01 specification, section 'autolayout algorithm', 389 pages, no later than Dec. 31, 1999.

Raza, M.; and Gulwani, S. 2017. Automated Data Extraction using Predictive Program Synthesis. In AAAI 2017. Association for the Advancement of Artificial Intelligence, 9 pages, no later than Dec. 31, 2017.

Raza, M.; and Gulwani, S. 2020. Web data extraction using hybrid program synthesis: A combination of top-down and bottom-up inference. In Proceedings of the 2020 ACM SIGMOD International Conference on Management of Data, 1967-1978, 16 pages, no later than Dec. 31, 2020.

Sun, K.; Rayudu, H.; and Pujara, J. 2021. A Hybrid Probabilistic Approach for Table Understanding. Proceedings of the AAAI Conference on Artificial Intelligence, 35(5): 4366-4374, 9 pages, no later than Dec. 31, 2021.

Wagstaff, K.; Cardie, C.; Rogers, S.; and Schrodl, S. 2001. Constrained K-Means Clustering with Background Knowledge. In Proceedings of the Eighteenth International Conference on Machine Learning, ICML '01, 577-584. San Francisco, CA, USA: Morgan Kaufmann Publishers Inc. ISBN 1558607781, 8 pages, no later than Dec. 31, 2001.

Wang, Z.; Dong, H.; Jia, R.; Li, J.; Fu, Z.; Han, S.; and Zhang, D. 2020. Structure-aware Pre-training for Table Understanding with Tree-based Transformers. CoRR, abs/2010.12537, 11 pages, no later than Dec. 31, 2020.

Yin, P.; Neubig, G.; Yih, W.-t.; and Riedel, S. 2020. TaBERT: Pretraining for Joint Understanding of Textual and Tabular Data. In Proceedings of the 58th Annual Meeting of the Association for Computational Linguistics, 8413-8426. Online: Association for Computational Linguistics, 15 pages, no later than Dec. 31, 2020.

Excel, M. 2022. Excel Tech Help Forum. https://techcommunity. microsoft.com/5/forums/searchpage/tab/message?q=conditionaln%20formatting, 7 pages, no later than Nov. 21, 2022.

N., J. 2022. Number of Google Sheets and Excel Users Worldwide. https://askwonder.com/research/number-googlesheets-users-worldwide-eoskdoxav, 3 pages, Feb. 25, 2021.

"Apply data validation to cells", retrieved from << https://support. microsoft.com/en-us/office/apply-data-validation-to-cells-29fecbcc-d1b9-42c1-9d76-eff3ce5f7249 >>, no later than Nov. 16, 2022, 5 pages.

Lingbo Li, et al., "ASTA: Learning Analytical Semantics over Tables for Intelligent Data Analysis and Visualization", retrieved from << https://arxiv.org/pdf/2208.01043.pdf >>, Aug. 8, 2022, 14 pages.

"CORNET: A neurosymbolic approach to learning conditional table formatting rules by example", as anonymous submission to Arxiv. org on Aug. 11, 2022, 13 pages.

Singh, et al., "CORNET: A neurosymbolic approach to learning conditional table formatting rules by example", as submission to Association for the Advancement of Artificial Intelligence on Aug. 15, 2022, 14 pages; paper without appendix also submitted Aug. 22, 2022 to Arxiv.org.

Chen, "SpreadsheetCoder: Formula Prediction from Semi-structured Context", In repository of arXiv:2106.15339, Jun. 26, 2021, 14 Pages.

Chen, et al., "Using Random Forest to Learn Imbalanced Data", In Technical Report (666) of University of California, Berkeley, no later than Jul. 31, 2004, pp. 1-12.

Li, et al., "Hamming Distance", In Publication of Springer, no later than Jan. 31, 2009, pp. 668-713.

Ma, et al., "CharBERT: Character-aware Pre-trained Language Model", In Proceedings of the 28th International Conference on Computational Linguistics, Dec. 8, 2020, pp. 39-50.

Neuwirth, et al., "The Active Modeler: Mathematical Modeling with Microsoft Excel", In Publication of Duxbury Press, Dec. 11, 2003, 9 Pages.

* cited by examiner

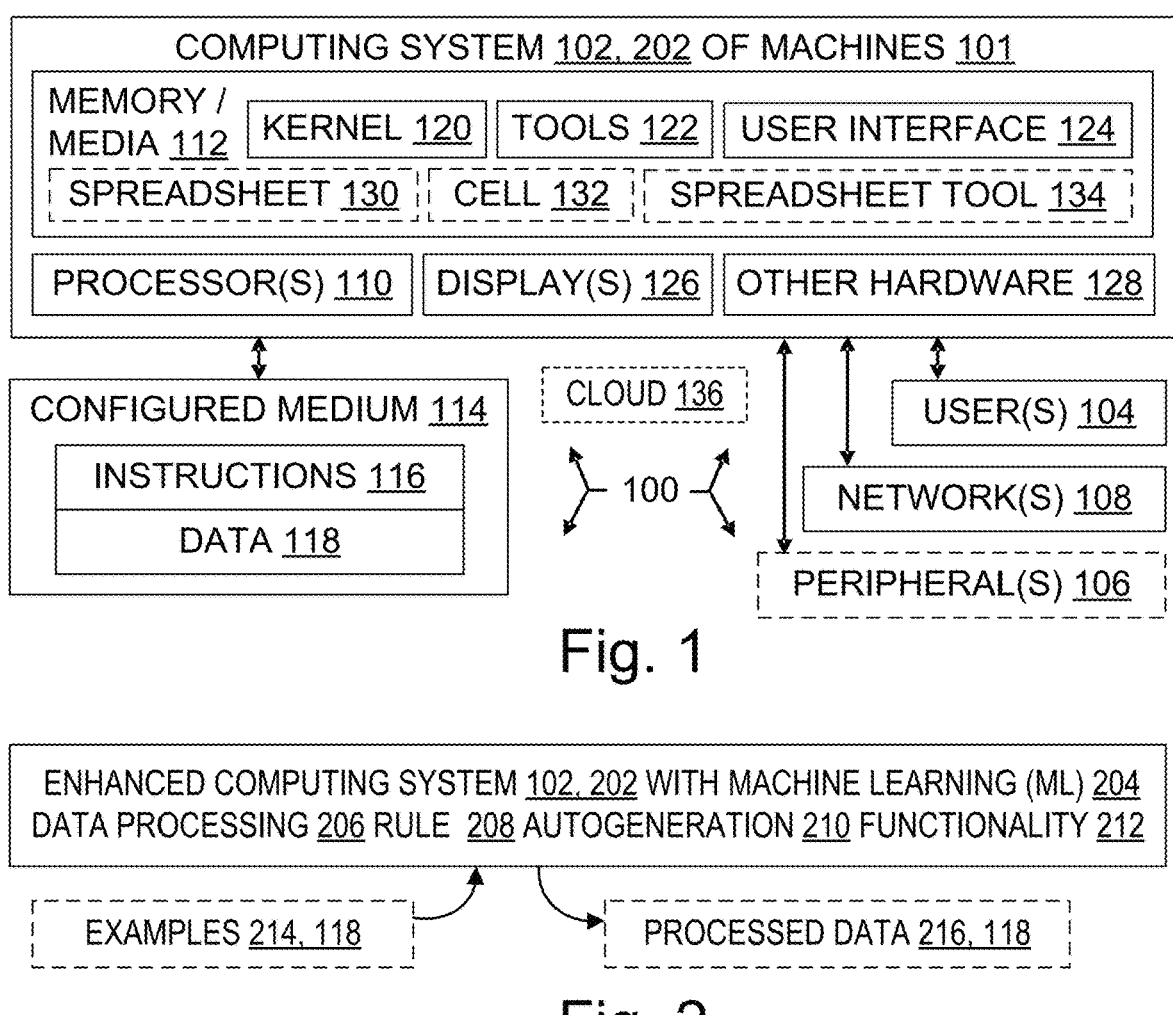
Fig. 1
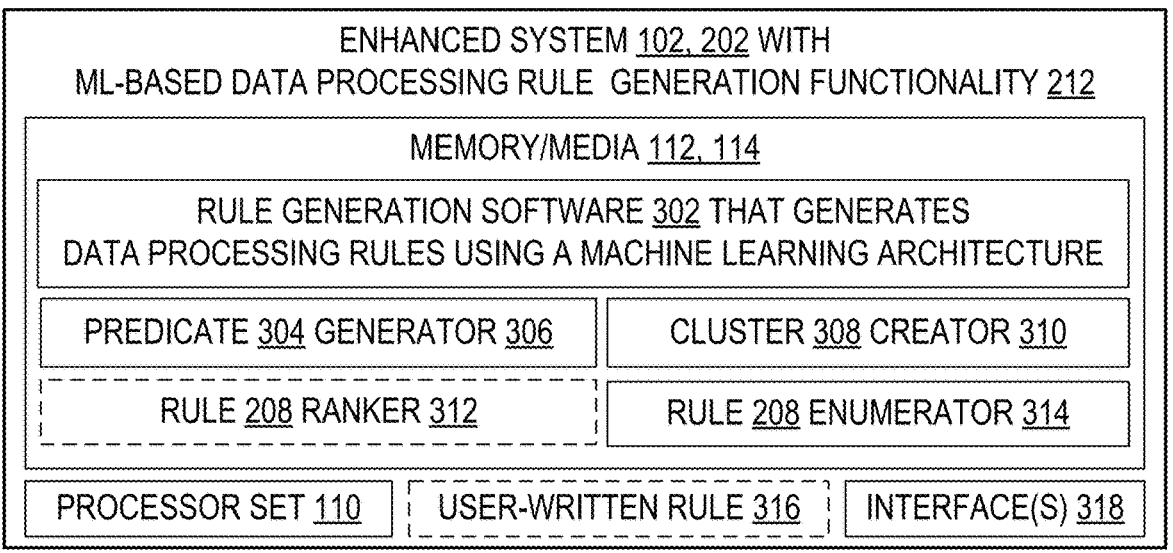
Fig. 2
Fig. 3

| SOME EXAMPLES OF RULES 208 AND RELATED ITEMS | | | |
|---|---|---|---|
| CONDITIONAL FORMATTING RULE 402 | FORMATTING RULE 404 | FILTERING RULE 406 | VALIDATING RULE 408 |
| SUGGESTION 412 OFFERING A RULE | RULE ENCODING 414 | COLUMN 416 ENCODING 418 | RANK 420 |

Fig. 4

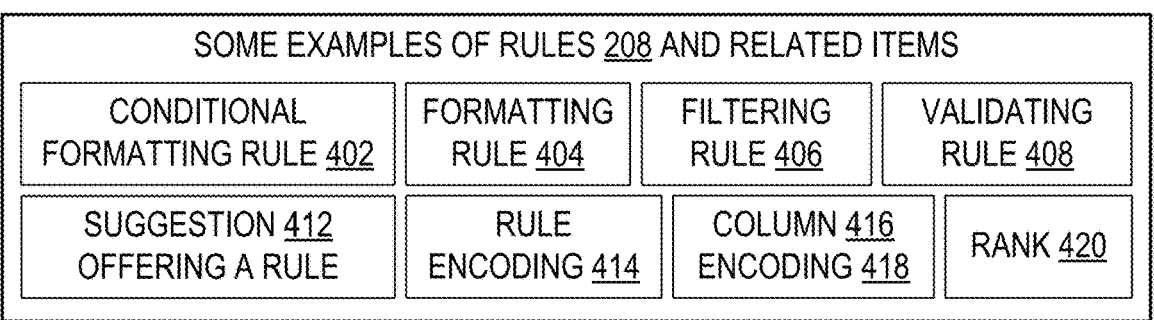

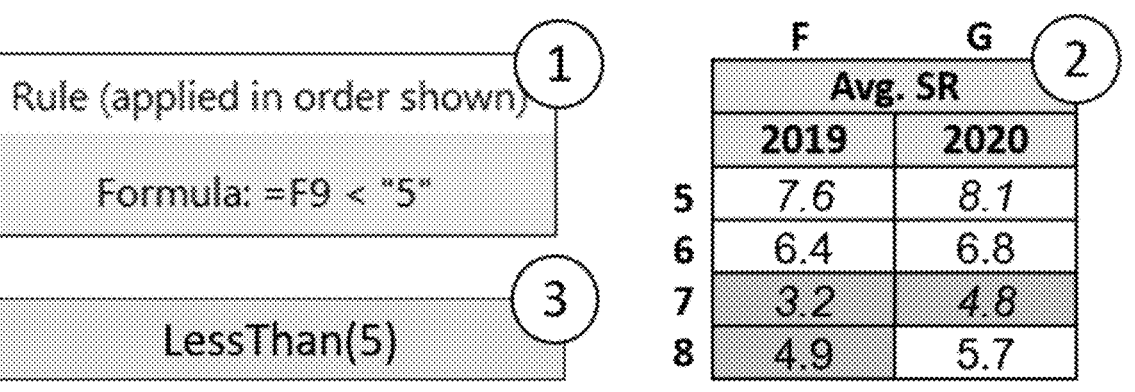

Algorithm 1: Rule Enumeration using Decision Trees

---

Require: Matrix of features $P$ and vector of labels $Y$
Ensure: A set of candidate rules 1: rules ← {}
2: forbidden ← {}
3: while accuracy $\geq \lambda_a$ and $|P \setminus \text{forbidden}| > 0$ do
4:     tree ← FIT($P \setminus \text{forbidden}, Y$)
5:     accuracy ← EVALUATE(tree, $P \setminus \text{forbidden}, Y$)
6:     forbidden ← forbidden ∪ ROOT(tree)
7:     if tree *satisfies user examples* ∧ accuracy $\geq \lambda_n$ then
8:         rules ← rules ∪ RULES(tree)
9: return rules

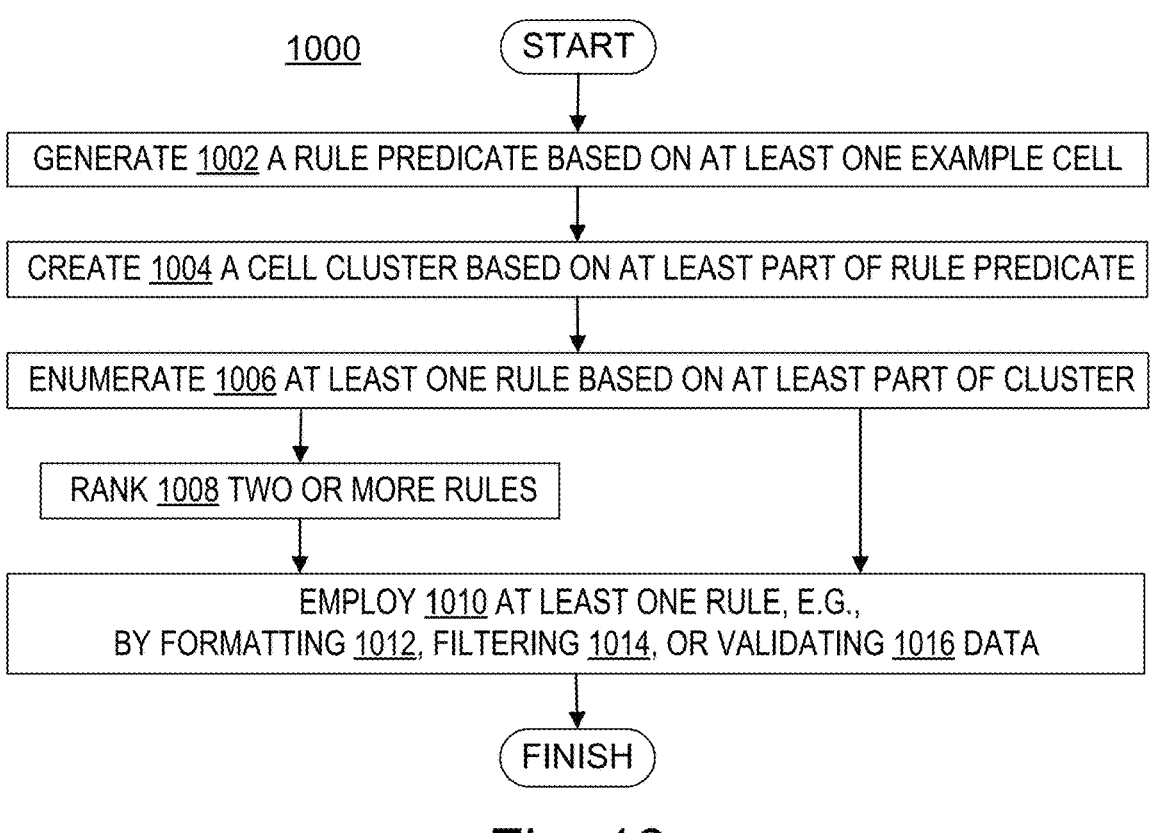

1000    START

GENERATE 1002 A RULE PREDICATE BASED ON AT LEAST ONE EXAMPLE CELL

CREATE 1004 A CELL CLUSTER BASED ON AT LEAST PART OF RULE PREDICATE

ENUMERATE 1006 AT LEAST ONE RULE BASED ON AT LEAST PART OF CLUSTER

RANK 1008 TWO OR MORE RULES

EMPLOY 1010 AT LEAST ONE RULE, E.G.,
BY FORMATTING 1012, FILTERING 1014, OR VALIDATING 1016 DATA

FINISH

Fig. 10

EXAMPLE PROCESSING RULE GENERATION METHODS 1100

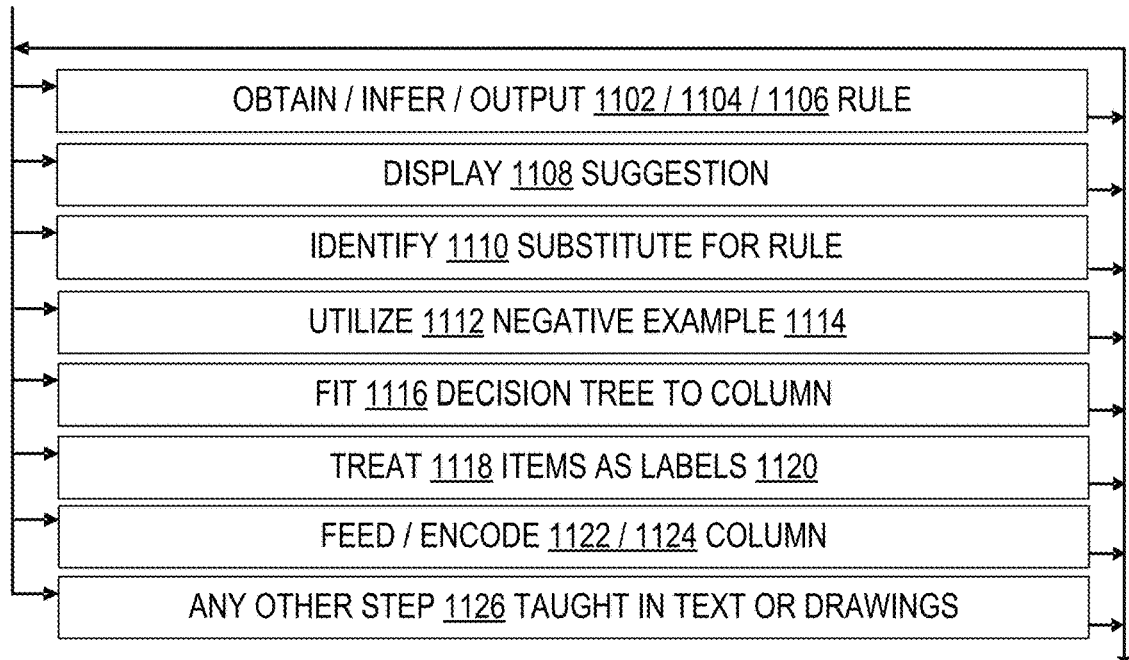

OBTAIN / INFER / OUTPUT 1102 / 1104 / 1106 RULE

DISPLAY 1108 SUGGESTION

IDENTIFY 1110 SUBSTITUTE FOR RULE

UTILIZE 1112 NEGATIVE EXAMPLE 1114

FIT 1116 DECISION TREE TO COLUMN

TREAT 1118 ITEMS AS LABELS 1120

FEED / ENCODE 1122 / 1124 COLUMN

ANY OTHER STEP 1126 TAUGHT IN TEXT OR DRAWINGS

Fig. 11

EXAMPLE-BASED AUTOGENERATED DATA PROCESSING RULES

BACKGROUND

Human-computer interaction often includes "manual" human-driven input, such as typing or operating a mouse or a touch screen. Many individual human-driven operations occur frequently in different combinations and for the most part do not individually accomplish more than a small fraction of an overall task. "Manually" generally implies "tediously" from a user's perspective and often also implies "in an error-prone way". For instance, writing a letter or a report or a file of source code generally involves "manually" entering text or numbers into an application program using a keyboard, often one character at a time, often with corrections along the way. In some instances, input occurs a bit faster, e.g., by cutting and pasting or by voice-to-text translation.

Some human input efforts are less tedious, in the sense that they lead to a greater change in a file being edited than the mere addition or deletion or relocation of a character or a word or a number. In certain cases, a macro or a script or another set of pre-specified program operations is performed on data; in these cases, a successful result depends on the data having the characteristics (e.g., location, format, value) that are expected by the pre-specified program. Also, the result of a single "manual" input may vary according to context, and thus be less tedious. In some cases, a single "manual" input such as pressing an Enter key or clicking a Send button results in many complex automatic operations. But most "manual" entry of data remains tedious and error-prone.

Although many advances have been made, improvements in data processing technologies remain possible, and are worth pursuing.

SUMMARY

Some embodiments described herein address technical challenges related to data processing. For example, in some scenarios an embodiment monitors interaction operations performed within a spreadsheet program or another application, such as data formatting operations, data filtering operations, or data validating operations, and then autogenerates data processing rules derived from those interactions. In particular, some embodiments described herein autogenerate spreadsheet data formatting rules based on examples of formatted data.

Some embodiments generate processing rules using a machine learning architecture. Rules are generated by some embodiments in situations where no rule yet exists in the program to produce a particular desired processing result, or in situations where a user has manually created a rule that produces the desired result but can also be simplified by the embodiment (and thus made more efficient and comprehensible), or in both situations.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including some aspects and items which are generally suitable for systems enhanced to generate data processing rules;

FIG. 2 is a diagram illustrating aspects of a computing environment and an enhanced system configured with data processing rule generation functionality;

FIG. 3 is a block diagram further illustrating aspects of an enhanced system configured with data processing rule generation functionality;

FIG. 4 is a block diagram illustrating some aspects and examples of data processing rules and related items;

FIG. 6 is a diagram illustrating an incorrect use of a conditional formatting rule in a spreadsheet program;

FIG. 9 is a pseudo-code listing which illustrates a rule enumeration algorithm that utilizes decision trees;

FIG. 10 is a flowchart illustrating steps in some data processing rule generation methods;

FIG. 11 is a flowchart further illustrating data processing rule generation methods, and incorporating FIG. 10.

DETAILED DESCRIPTION

Overview

Figure 5:
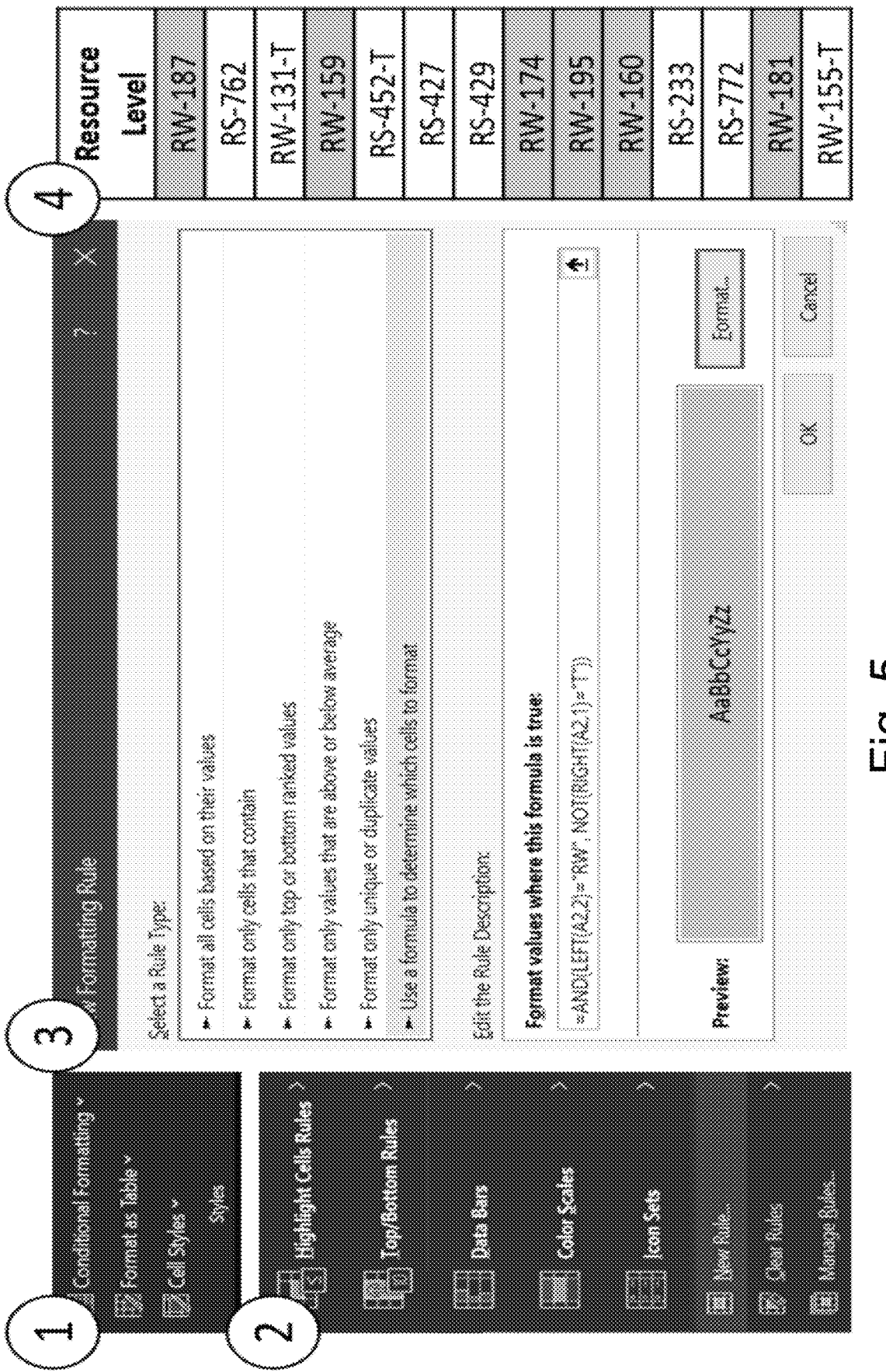
FIG. 5 is a user interface diagram illustrating some aspects of adding a conditional formatting rule in a spreadsheet program.

Innovations may expand beyond their origins, but understanding an innovation's origins can help one more fully appreciate the innovation. In the present case, some teachings described herein were motivated by technical challenges arising from ongoing efforts by Microsoft innovators to improve the usability, efficiency, and power of the Excel® spreadsheet program (mark of Microsoft Corporation).

Microsoft innovators noted that users sometimes format spreadsheet cells manually. Some users do not know that rule-guided formatting is available. Some users are aware that rule-guided formatting is available, but for reasons such as unfamiliarity with rule syntax or a preference for manual formatting over the experimentation they face to formulate or tune rules, choose to not fully utilize the rule-guided formatting capability.

Accordingly, some embodiments taught herein automatically generate formatting rules 208 based on examples which include data cells 132 formatted manually by users. This functionality 212 allows users of a spreadsheet program 134 to make use of conditional formatting rules 208 without having to write the rules manually. Writing conditional formatting rules manually can be hard for a user because it requires an understanding of the conditional formatting operators, the underlying formula language, and the data logic that the user wants to implement. Some embodiments help users by autogenerating 1100 conditional formatting rules from examples of formatted data 118. Some embodiments also improve discoverability of conditional formatting rules by suggesting 1108 rules proactively to a user, while the user manually formats cells.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface 124 supports interaction between an embodiment and one or more human users. In some embodiments, the user interface 124 includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include office productivity tools or software apps, on mobile devices 102 or workstations 102 or servers 102, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, data processing 206 rule autogeneration functionality 212 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, methods, systems, functionalities, mechanisms, data structures, applications, entities, or other items in a computing environment, which are disclosed herein but not associated with a particular reference numeral herein. Corresponding drawings may also be added.

More About Systems

FIGS. 2 and 3 illustrate versions of a computing system 102 configured by one or more of the data processing rule generation enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items and FIG. 3 items are discussed at various points herein, and additional details regarding them are provided in the discussion of a List of Reference Numerals later in this disclosure document.

FIG. 4 shows some aspects and examples of data processing rules 208 and related items. This is not a comprehensive summary of all aspects of data processing or all aspects of data processing rule generation functionality 212 involving one or more machines 101. Nor is it a comprehensive summary of all aspects of an environment 100 or system 202 or other context of a tool 122 which may be enhanced with data processing rule autogeneration capability 212, or a comprehensive summary of all data processing rule autogeneration mechanisms for potential use in or with a system 102. FIG. 4 items are discussed at various points herein, and additional details regarding them are provided in the discussion of a List of Reference Numerals later in this disclosure document.

FIGS. 5 through 9 illustrate some aspects and examples of data processing rule autogeneration and related items. These topics are discussed at various points herein.

In some embodiments, the enhanced system 202 is networked through an interface. In some, an interface includes hardware such as network interface cards, software such as network stacks, APIs, or sockets, combination items such as network connections, or a combination thereof.

In some embodiments, a neuro-symbolic machine learning computing system 202 is configured to receive as input a plurality of cells 132 wherein each cell contains data 118. The system 202 is configured to produce as output at least one data processing rule 208. The system 202 includes a digital memory 112, and a processor set 110 in operable communication with the digital memory. The processor set 110 is configured to perform data processing rule generation operations. The system 202 includes: an executable predicate generator 306 which upon execution by the processor set generates a rule predicate 304 based on at least one of the cells; an executable semi-supervised cluster creator 310 which upon execution by the processor set creates a cell cluster 308 based at least in part on the rule predicate; and an executable rule enumerator 314 which upon execution by the processor set enumerates at least one rule 208 based at least in part on the cell cluster. "Execution by the processor set" means execution by one or more processors. This includes embodiments that use N processors out of M available processors, where $1 <= N <= M$.

In some embodiments, the executable rule enumerator upon execution by the processor set enumerates 1006 at least one of the following data processing rules: a conditional formatting rule 402 in which a format of a given cell is conditioned upon at least a data value in the given cell; a formatting rule 404 which specifies a format of a data value in the given cell; a filtering rule 406 in which a filtering result of a given cell is conditioned upon at least a data value in the given cell; or a validating rule 408 in which a validity characterization of a given cell is conditioned upon at least a data value in the given cell.

In some embodiments, the cells 132 include a first set of spreadsheet cells, and the executable rule enumerator 314 upon execution by the processor set enumerates 1006 at least two conditional formatting rules 402 which format a second set of spreadsheet cells.

In some embodiments, the computing system 202 further includes an executable ranker 312 which upon execution by the processor set ranks 1008 at least two rules. In some embodiments, the ranker includes at least one of the following: a combination neural and symbolic ranker which produces a rank based on a combination of collected predicates 304 and an encoding 418 of a column of data; a symbolic ranker which produces a rank independent of any data column encoding; or a neural ranker which produces a rank based on a rule encoding 414.

In some embodiments, the computing system 202 further includes a spreadsheet program 134 having a user interface 124, wherein the spreadsheet program is configured to obtain 1102 a rule and to display 1108 in the user interface a suggestion 412 offering to employ 1010 the rule for at least one of: formatting 1012 data, filtering 1014 data, or validating 1016 data.

Other system embodiments are also described herein, either directly or derivable as system versions of described processes or configured media, duly informed by the extensive discussion herein of computing hardware.

Although specific data processing rule autogeneration architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of machine learning functionality 204, for example, as well as different technical features, aspects, security controls, mechanisms, rules, criteria, expressions, hierarchies, operational sequences, data structures, environment or system characteristics, or other functionality 212 teachings noted herein, and may otherwise depart from the particular illustrative examples provided.

Processes (a.k.a. Methods)

Methods (which are also be referred to as "processes" in the legal sense of that word) are illustrated in various ways herein, both in text and in drawing figures. FIGS. 10 and 11 each illustrate a family of methods 1000, 1100 respectively, which are performed or assisted by some enhanced systems, such as some systems 202 or another functionality 212 enhanced system as taught herein. Method family 1000 is a proper subset of method family 1100. FIGS. 1 through 9 show data processing rule autogeneration architectures with implicit or explicit actions, e.g., steps for reading, writing, or otherwise processing data 118, in which the data 118 include, e.g., spreadsheet cell 132 data, rule predicates 304, rule clusters 308, decision trees, and ranks 420, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some embodiments a human 104 types in a value for the system 202 to use as spreadsheet cell contents. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 11. FIG. 11 is a supplement to the textual examples of embodiments provided herein and the textual descriptions of embodiments provided herein. In the event of any alleged inconsistency, lack of clarity, or excessive breadth due to an aspect or interpretation of FIG. 11, the text of this disclosure shall prevail over that aspect or interpretation of FIG. 11. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1100 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 11 to be non-operable, the sequence S is not within the scope of any claim. Any assertion otherwise is contrary to the present disclosure.

Some embodiments provide or utilize a method to facilitate processing data in cells, the method performed (executed) by a computing system 202, the method including: generating 1002 a rule predicate based on at least one cell; creating 1004 a cell cluster based at least in part on the rule predicate; enumerating 1006 at least two rules based at least in part on the cell cluster; ranking 1008 at least two rules; and employing 1010 at least one ranked rule, thereby performing at least one of: data formatting 1012, data filtering 1014, or data validating 1016. In a variation, the ranking 1008 is omitted.

In some embodiments, employing 1010 at least one ranked rule includes at least one of the following: displaying 1108 in a software tool a suggestion offering to perform formatting of at least one additional cell based on at least one ranked rule; in a software tool, performing formatting 1012 of at least one additional cell based on at least one ranked rule; displaying 1108 in a software tool a suggestion offering to perform filtering of at least one additional cell based on at least one ranked rule; in a software tool, performing filtering 1014 of at least one additional cell based on at least one ranked rule; displaying 1108 in a software tool a suggestion offering to perform validating of at least one additional cell based on at least one ranked rule; or in a software tool, performing validating 1016 of at least one additional cell based on at least one ranked rule.

Some embodiments learn a simpler formatting rule than a rule the user already has. The more complicated rule could be one that a user wrote, or one pre-loaded into the tool, or one previously autogenerated, for example. Herein, a Rule1 is a "substitute" for a Rule2 when Rule1 is an execution match to Rule2, in a manner consistent with the description of an execution match discussed herein in connection with "Evaluation Metrics". Herein, a Rule1 is "simpler" than a Rule2 when Rule1 has fewer predicates than Rule2 or uses more built-in predicates than Rule2, or both, consistent with the discussion herein of "Learning simpler rules than the user's ground truth".

In some embodiments, and under the definitions noted in the preceding paragraph, employing 1010 at least one ranked rule includes identifying 1110 a simpler substitute for another rule. In some, employing 1010 at least one ranked rule includes identifying 1110 any substitute for another rule. Some embodiments improve rule processing speed, by replacing more complex rules with simpler rules. One of skill will acknowledge that complex rules often take a system longer to process because they contain more predicates to be evaluated.

Some embodiments infer a formatting rule from a sheet with formatting but no stated rule. A sheet without conditional formatting (CF) rules is one where the user has not written a CF rule, but has rather performed the formatting manually (e.g., colored cells in yellow, based on some implicit logic). Some embodiments take that manual formatting as a set of examples, which are input to the rule generation functionality 212. When the implicit logic that led the user to format their data is expressible in a CF domain specific language, then the embodiment generates 1100 a CF rule that performs the same formatting on the same data.

In some embodiments, the method infers 1104 a formatting rule from formatted data cells located outside a spreadsheet.

Some embodiments utilize semi-supervised clustering 1004. Semi-supervised clustering is optimal when an embodiment has some information from the user, e.g., a few examples the user has manually formatted and also has some implicit information, e.g., the rest of cells that are unformatted. A supervised approaches is not optimal when an embodiment doesn't have ground truth labels for each of these cells, e.g., should they be formatted or not. An unsupervised approach is also not optimal, because it fails to leverage the available information.

In some embodiments, creating 1004 a cell cluster includes performing semi-supervised clustering.

Some embodiments utilize soft negative examples during clustering 1004. Two alternatives are (a) no use of negative examples, and (b) treating all negative examples as hard examples.

In some embodiments, creating 1004 a cell cluster utilizes 1112 one or more soft negative examples 1114.

Some embodiments utilize decision trees, and some utilize other learning methods, to extract 1006 rules expressed in a domain specific language (DSL). For instance, some alternatives to decision trees are inductive logic programming, brute force depth first search, or brute force breadth first search.

In some embodiments, enumerating 1006 at least one rule includes at least one of: learning a decision tree, executing an inductive logic program, or performing a brute force search.

Although many examples herein discuss data formatting, the machine learning architecture teachings disclosed can also be applied beneficially for data filtering, or data validating, for instance. Indeed, in at least one version of the Microsoft Excel® spreadsheet tool 134, the formatting DSL is the same as the filtering DSL. A DSL defines a space of possible rules.

In some embodiments, the method further includes at least one of the following: fitting 1116 a decision tree to a column of cells; treating 1118 user formatted examples as positive labels 1120 and unformatted cells as negative labels 1120; feeding 1122 numeric columns directly into a decision tree; feeding 1122 datetime columns directly into a decision tree; or encoding 1124 text columns using an ordinal label encoder.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as rule data structures 208, software 302 which performs a method 1100, clusters 308, columns 416, encodings 414 and 418, and suggestions 412, in the form of data 118 and instructions 116, read from a removable storage medium 114 and/or another source such as a network connection, to form a configured storage medium. The configured storage medium 112 is capable of causing a computer system 202 to perform technical process steps for data processing rule generation 210, as disclosed herein. The Figures thus help illustrate configured storage media embodiments and process (a.k.a. method) embodiments, as well as system and process embodiments. In particular, any of the process steps illustrated in FIG. 10 or 11 or otherwise taught herein may be used to help configure a storage medium to form a configured storage medium embodiment.

Some embodiments use or provide a computer-readable storage device 112, 114 configured with data 118 and instructions 116 which upon execution by a processor 110 cause a computing system to perform a software development method for producing at least one data processing rule, the method performed by a computing system 202 in a cloud computing environment 136, 100 or in another computing environment 100, or both. This method includes: generating 1002 rule predicates based on at least one formatted cell; creating 1004 cell clustering based at least in part on the rule predicates; enumerating 1006 at least one rule based at least in part on the cell clustering; if at least two rules are enumerated then ranking 1008 at least two rules relative to each other; and outputting 1106 at least one rule, thereby facilitating rule-based data processing.

In some embodiments, outputting 1106 includes outputting 1106 at least one data formatting 1012 rule 404 or 402 or both (each of which is an example of rules generally 208). In some, outputting 1106 includes outputting 1106 at least one data filtering 1014 rule 406, 208. In some, outputting 1106 includes outputting 1106 at least one data validating 1016 rule 408, 208.

In some embodiments, the method infers 1104, 210 a data filtering rule. In some, the method infers 1104, 210 a data validating rule. In some, the method infers 1104, 210 a data formatting rule.

In some embodiments, at least two rules are enumerated, and ranking produces a rank based on a combination of collected predicates and an encoding of a set of data.

Additional Observations

Additional support for the discussion of data processing rule generation functionality 212 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some popular spreadsheet software supports automatically formatting tables based on data-dependent rules, but these rules can be difficult for users to write. Some embodiments taught herein help spreadsheet users format their data, by automatically learning formatting rules from examples of formatted cells. A machine learning system architecture that produces learned conditional formatting rules includes predicate generation, semi-supervised clustering, tree-based rule enumeration, and neural ranking. This functionality 212 will make data formatting even easier for spreadsheet tool users.

Some embodiments use or provide functionality 212 for conditional formatting by example. Spreadsheets are widely used for table manipulation and presentation. A spreadsheet is an example of a table. Stylistic formatting of these tables is an important property for both presentation and analysis. As a result, popular spreadsheet software supports automatically formatting tables based on data-dependent rules. Unfortunately, writing these formatting rules can be challenging for users as it requires knowledge of the spreadsheet software, underlying rule language, and data logic.

Some teachings herein are consistent with CORNET (conditional ornamentation by example for tables), a neuro-symbolic system that tackles the problem of automatically learning such formatting rules from user examples of formatted cells. CORNET repurposes aspects of program synthesis and combines symbolic rule enumeration, based on semi-supervised clustering and iterative decision tree learning, with a neural ranker to pro-duce conditional formatting rules. CORNET is not identical with the scope of teachings presented herein, but is an illustrative example of how some teachings are beneficially applied.

To motivate and evaluate an approach, a team extracted tables with formatting rules from a corpus of over 40K real spreadsheets. Using this data, the team compared CORNET to a wide range of symbolic and neural baselines. The results show that CORNET can learn rules more accurately, across varying conditions, compared to baselines.

Beyond the topic of learning rules from user examples, this discussion presents two case studies to motivate additional uses for CORNET: simplifying user conditional formatting rules and recovering rules even when the user may have manually formatted their data.

This discussion introduces a neuro-symbolic design to tackle the conditional formatting by example problem. A symbolic rule enumerator 314 guarantees that the rules synthesized are valid within the corresponding spreadsheet software, while a neural rule ranker 312 captures preferences for otherwise competing predicates 304 such as string equality versus prefixes or suffixes. The symbolic rule enumerator also makes use of a semi-supervised clustering 1004 approach, which allows a system 202 to take advantage of soft information, such as the lack of formatted cells between formatted cells (positional information). This soft information reduces the number of examples (formatted and unformatted) needed to learn rules 208 effectively.

Conditional formatting (CF) is a feature that automates table formatting based on user-defined data-dependent rules. It is a standard feature in many spreadsheet manipulation tools 134. Many tools 134 support predefined templates for popular rules, such as value greater than a specific value. Some tools 134 also support custom rules, where a user can enter a Boolean-valued formula to format cells. FIG. 5 illustrates adding CF Rule in an Excel® program 134 (mark of Microsoft Corporation). The circled 1 indicates a CF Option in a Styles Pane; circled 2 indicates a CF Dropdown Menu to add a new rule; circled 3 indicates a CF New Rule Dialog box; and circled 4 indicates a resulting formatted column from rule. In an enhanced system 202, after the user formats two cells, CORNET software 302 (a.k.a. "COR-NET" or "Cornet") automatically suggests the intended CF rule for the user.

Unfortunately, creating conditional formatting rules requires users to understand the syntax and logic behind them. As of June 2022, more than 10,000 conditional formatting related questions were posted on the Excel® tech help community alone. By analyzing the posts, the innovation team discovered three key struggles that prevent users from using CF to its full potential. First, many users are unaware of this feature and manually apply formatting to their spreadsheets. Second, when a user does enter a CF rule, they sometimes fail to do so correctly and end up manually formatting the sheet. Third, even when users write valid rules that matches their desired formatting, the rules are either unnecessarily complex (can be rewritten to much simpler rules), or not generalizable (may produce wrong formatting when the columns change).

Example 1. FIG. 6 shows a case from a public spreadsheet where the user wanted to highlight cells with value <5, but wrote an incorrect rule and had to manually format the sheet. In the FIG. 6 example of incorrectly using CF, material at circled 1 indicates that the user defined a custom rule that always evaluates to false (it compares the cell to the string "5" instead of the number 5). Material at circled 2 indicates that because the rule does not format any cell, the user had to manually format the sheet. Material at circled 3 indicates a correct rule for the formatting.

Some of these struggles are reinforced by limitations in the interface used to apply conditional formatting. For example, using logical operations like OR and AND requires writing custom formulas. Additionally, there is no validation for data types, which can cause surprising results. For example, it is possible to write a rule that formats cells whose value is less than 5 for a text column.

This discussion presents CORNET (Conditional ORNamentation by Examples in Tables), a system 202 that allows users to automatically generate a formatting rule from examples, thus obviating the challenges outlined. CORNET takes a small number of user formatted cells as input to learn the most likely formatting rule that generalizes to other cells. CORNET explores possible predicates for the target column, hypothesizes cell grouping via semi-supervised clustering and then learns candidate rules by employing an iterative tree learning procedure. Since multiple rules may match the examples, CORNET uses a neural ranker to return the most likely CF rule to the user. For example, in FIG. 5, after the user formats two cells, CORNET suggests the intended CF rule.

Some programming-by-example (PBE) systems can typically derive useful search constraints by relating properties of the outputs to the inputs provided (e.g., an output text may share spans with an input text). This is challenging to do in CF learning as the user only provides what amounts to a small number of formatting labels. The predicate generation and clustering step in CORNET mitigates this by generating and applying simple predicates, which jointly can help hypothesize such formatting labels for the entire target column. Once these hypothesized labels are available, COR-NET can apply an iterative rule enumeration procedure. CORNET can enumerate multiple possible programs consistent with hypothesized outputs. CORNET enumeration uses tree learning, to more easily enforce consistency over user-provided examples. The learning process is iterative to induce diversity of candidate rules. Finally, CORNET can employ a ranker to disambiguate between these competing programs by capturing properties not just of the rule but also of the underlying data and the execution of the rule on that data.

To evaluate CORNET, the innovation team created a benchmark of nine hundred sixty-eight real user tasks from public Excel® spreadsheets. CORNET outperforms symbolic and neural baselines that were adapted to the problem, by accurately learning conditional formatting rules with as few as two or three formatted examples.

This discussion makes several contributions. Based on the observation that users often struggle to format their tabular data, this discussion introduces the problem of learning conditional formatting rules from examples. This discussion proposes a neuro-symbolic system CORNET to learn CF rules from examples over tabular data. CORNET is based on a PBE methodology that leverages few examples to predict more examples and then generalize them into an intended CF rule. This is done via a combination of symbolic (predicate set) enumeration, ML methods of semi-supervised clustering (to predict more examples using predicate set) and iterative tree learning (to propose candidate rules), and a neural ranker (to pick an intended rule). CORNET outperforms baselines by 20-25%.

Conditional formatting is often a preliminary step to performing further sophisticated analysis such as conditional transformations for data cleaning or visualizations. Work on automating conditional formatting motivates research in automating such more encompassing workflows.

Problem Definition. Let $C=[c_i]i=1 \ldots n$ be a column of n cells with each cell $c_i$ represented by a tuple $(v_i, t_i)$ of its value $v_i \in V$ and its annotated type $t_i \in T$. In this discussion, string, number, and date are possible types; these are available in most spreadsheet software. Associate a format identifier $f_i \in N0$ (or simply format) with each cell, which corresponds to a unique combination of formatting choices made by the user. A special identifier $f_1=0$ is reserved for cells without any specific formatting. This discussion considers cell fill color, font color, font size, and cell borders.

A conditional formatting rule 402 (or simply rule 208) may be viewed as implementing a function $r: C \rightarrow N0$ that maps a cell to a formatting identifier. Given a column C and specification, a goal of automatic formatting is to find a rule r such that $r(c_i)=f_i$ for all $c_i \in C$. Let $C^*=\{c_i|c_i \in C, f_i/=f\perp\}$ be the cells with formatting applied. A goal of automatic formatting by example is to find r given only a small, observed subset $Cobs \subset C^*$. The elements of Cobs are formatted examples. Any cell in C\Cobs is considered unlabeled, including unformatted cells. The examples in Cobs do not provide a complete problem specification.

To find the best r, treat the problem as a heuristic search over candidate rules R. Let $h: R \times Cn \rightarrow R$ be a function that takes a rule r and a column C and returns an estimate of the quality of r with respect to C, e.g., how likely it is that a user would have wanted this rule. Given a column C with only a few formatted cells, try to find the rule $r^*=\arg \max r \in R$ h(r, C) that maximizes this heuristic. In hindsight, learning CF rules shares motivations with multilabel classification with limited and noisy supervision.

Automatic conditional formatting by example involves a space of possible rules R, a method to enumerate candidate rules $r \in R$ and a method of evaluating the quality of such rules. The following section describes an approach, aided by an analysis of real user spreadsheets.

CORNET learns rules from a small number of examples. One may restrict rules to being logical combinations of Boolean-valued properties of cells. Still, the space of combinations of predicates is much larger than the space of possible outputs. Rather than directly learning a program that generalizes to unlabeled cells, this approach therefore first predicts the expected output on the whole column.

Figure 7A:
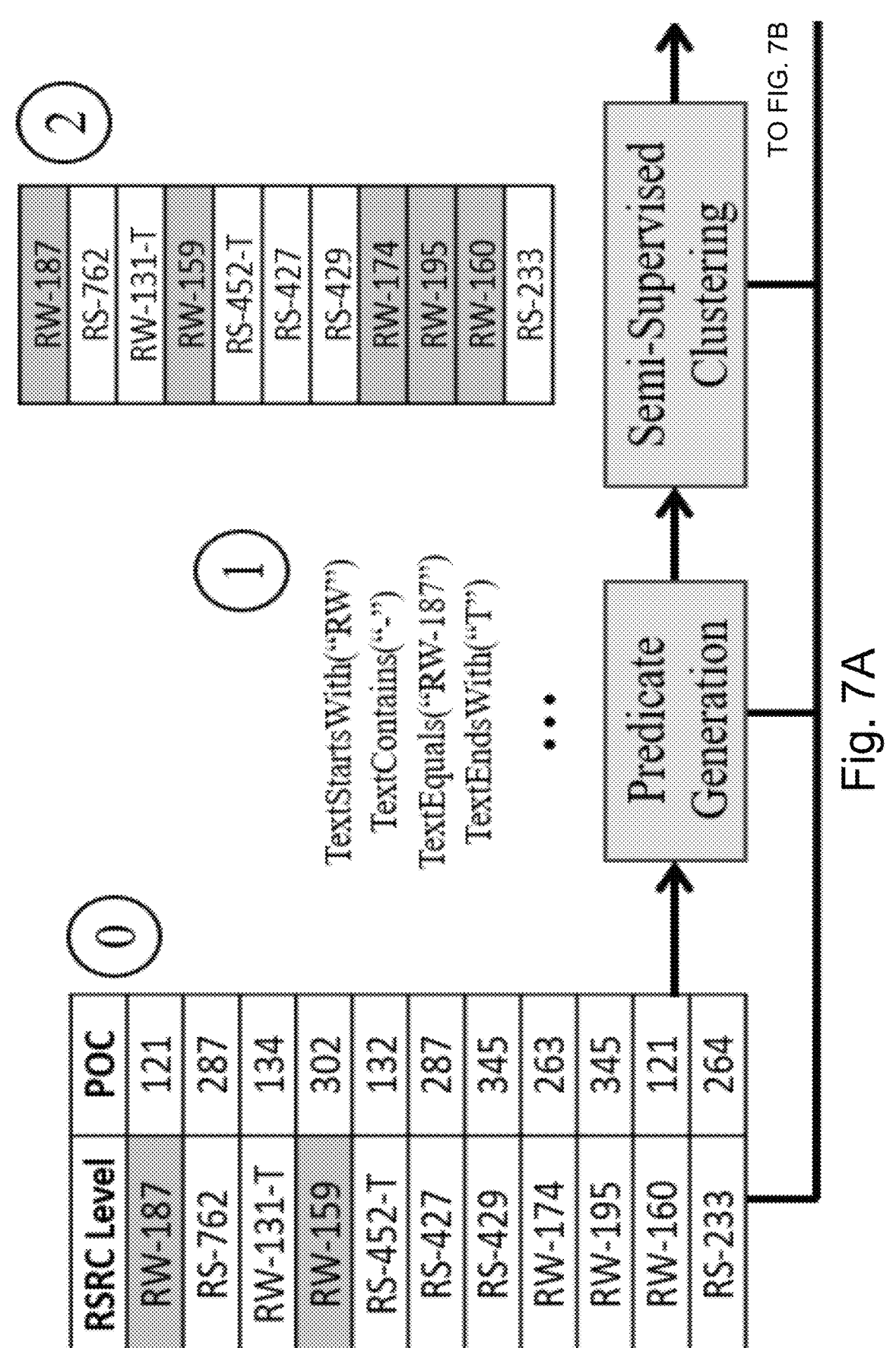
FIG. 7A and FIG. 7B collectively show a diagram illustrating a machine learning architecture for generating a formatting rule in a spreadsheet program.
Figure 7B:
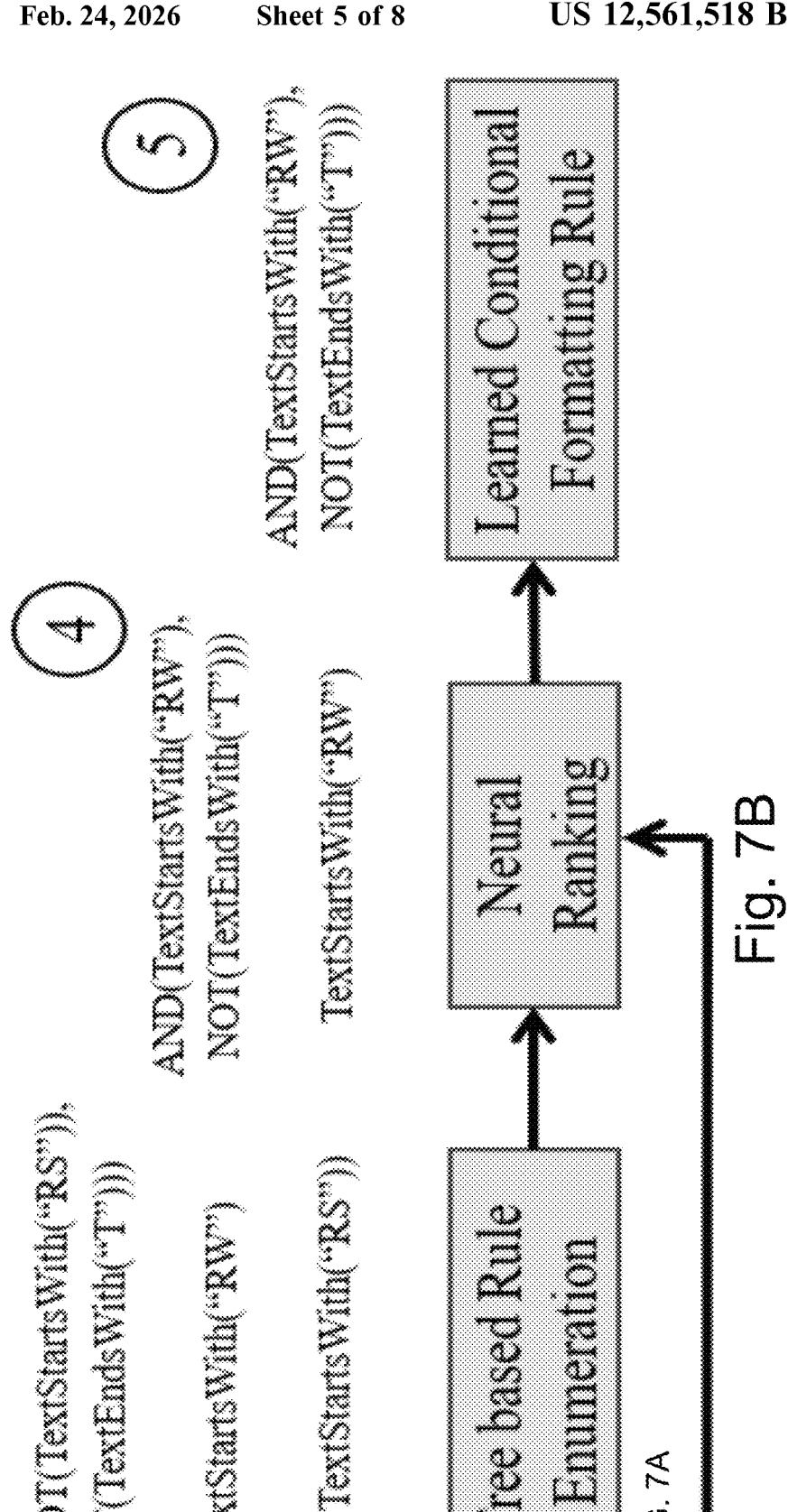

FIGS. 7A and 7B show a schematic overview of COR-NET. Step 1 enumerates cell properties using predicates. Step 2 computes the expected output using semi-supervised clustering. Once this is known, CORNET enumerates programs that match this output in step 3, and ranks them in step 4. The following sections describe the challenges and solutions for each step.

Predicate Generation. This step enumerates a set of properties that hold for a strict subset of the cells of the given column. Each property is encoded as a predicate: a Boolean-valued function that takes a cell c, zero or more arguments and returns true if the property that it describes holds for c. To avoid redundancy, all predicates are assigned a type $t_i$ and they only match cells of their type. Supported predicates are shown in Table 1:

| Numeric | Datetime | Text |
|---|---|---|
| greater(c, n) | greater(c, n, d) | equals(c, s) |
| greaterEquals(c, n) | greaterEquals(c, n, d) | contains(c, s) |
| less(c, n) | less(c, n, d) | startsWith(c, s) |
| lessEquals(c, n) | lessEquals(c, n, d) | endsWith(c, s) |
| between(c, n1, n2) | between(c, n1, n2, d) | |

Table 1 shows supported predicates and their arguments for each data type, for some embodiments. The d argument in datetime predicates determines which part of the date is compared: day, month, year, or weekday. For example, greater(c, 2, month) matches datetime cells with a date in March or later for any year.

Given a column of cells and a predicate, a goal is to initialize each additional argument to a constant value such that the predicate returns true for a strict subset of the column. Table 2 shows an overview of how the additional argument values are initialized for predicates of each type. Table 2:

| Type | Arg(s) | Values |
|---|---|---|
| numeric | n | all numbers that occur in the column |
| numeric | n | summary statistics: mean, min, max, and percentiles |
| numeric | n | popular constants such as 0, 1 and 10-to-the-n |
| numeric | n1 and n2 | use numeric generators for n and keep the ones n1 < n2 |
| text | s | tokens obtained by splitting on nonalphanumeric delimiters |
| text | s | tokens from prefix trie |
| date | n and d | for available d, extract numeric value and use generator for n |

Table 2 shows an overview of constants for concretizing predicates of each type. For example, CORNET generates constants for text predicates from two token sources.

Semi-supervised Clustering. Rather than immediately combine predicates into rules, CORNET first predicts the expected output of the rules on the column's unobserved (i.e., unformatted) cells. This allows CORNET to leverage the relatively small search space of output configurations over cell properties to find programs that generalize to similar cells. CORNET biases the output using a programmatic vocabulary of predicates instead of relying on arbitrary cell clustering.

More concretely, CORNET assigns a potentially noisy formatting label $\hat{f}i$ to each unobserved cell $ci/\in$ Cobs by building on two insights. First, tables are typically annotated by users from top to bottom, which implies that there is positional information available. In particular, cells $ci/\in$ Cobs such that there exist $cj$, $ck \in$ Cobs for which $j<i<k$ are likely intended to have no formatting associated with them. This set of $ci$ is soft negative examples. Second, user provided examples Cobs are treated as hard constraints; CORNET assumes that the user has provided their formatting goals without errors.

CORNET performs iterative clustering over k clusters, where k is the number of unique format identifiers for the column, plus one cluster for unassigned cells. The distance between two cells is the size of the symmetric difference between the sets of predicates that hold for either cell. Let clusterf be the cluster associated with format f. Some supervision is introduced by initializing each cell $ci \in$ Cobs to clusterfi and soft negative example cells to cluster0. These cells are never assigned to another cluster. The remaining cells Cu are assigned to the unknown formatting cluster, labeled clusteru. CORNET iteratively reassigns $cu \in$ Cu to a new cluster. Instead of computing a cluster medoid, however, CORNET combines the minimal and maximal distance to any element of the cluster. This is computationally much more efficient (linear instead of quadratic in the number of distance computations) and was found to perform well in practice.

When clusters become stable or a maximal number of iterations is reached, each cell takes the format value of their associated cluster, with clusteru added to cluster0. If $ci \in$ Cobs, then $\hat{f}i=fi$.

Candidate Rule Enumeration. After clustering, CORNET has a target formatting label $\hat{f}i$ for each ci in C. CORNET now learns a set of candidate rules R such that $r(ci)=\hat{f}i$ for all $r \in R$. CORNET defines the space of rules and a search procedure as taught in the following two subsections.

Predicates to Rules. A rule in CORNET for a column C consists of a set of tuples $(rf, f)$ with $rf: C \rightarrow B$ a function that takes a cell and returns a Boolean and $f \in N0$ a format identifier. These rf are disjoint with respect to C such that for each $c \in C$, there is at most one rf such that rf (c)=true, in which case rf matches c. For a given cell, the rule returns the associated f if it evaluates to true. The cell is left unformatted if all rf evaluate to false.

CORNET supports rf that can be built as a propositional formula in disjunctive normal form over predicates. In other words, every rf is of the form $(p1(c)\wedge p2(c)\wedge \ldots )\vee(pj(c)$ $\sim pj+1(c)\wedge \ldots ) \vee \ldots$ with pi a generated predicate or its negation. A goal is to strike a balance between expressiveness and simplicity.

In this context, FIGS. 7A and 7B show a system architecture, illustrated through the example case from FIG. 5. The circled 0 indicates an input table with partial formatting, circled 1 indicates predicate generation for all cells in the table, circled 2 indicates semi-supervised clustering using examples and other cells to address the challenge of unlabeled cells, circled 3 indicates enumerating rules based on the clustering using multiple decision trees, circled 4 indicates a neural ranker to score generated rules, and circled 5 indicates a final learned conditional formatting rule.

Enumerating Rules. Despite the large search space, CORNET can generate candidates by learning rules for each format separately in a one versus all setting. In this setting, the rule for a format f is expected to consist of predicates that either hold for many cells with format f and few with other formats, or vice versa. Taking this one step further, the combination of predicates in a conjunction in one rf should either only hold for cells with format f or not hold for any cell with format f. Based on this intuition, CORNET greedily enumerates promising candidates by iteratively learning decision trees and using predicates as features. Each decision tree then corresponds to a rule in disjunctive normal form.

CORNET addresses three challenges: variety in rules, simplicity of rules, and coping with noisy labels. To ensure variety, the root feature is removed from the set of candidates after each iteration. To ensure simplicity, CORNET only accepts decision trees with $\lambda n$ or fewer nodes. To deal with noisy labels, CORNET only requires decision trees to have perfect accuracy on observed examples; it considers labeled cells to be twice as important as unlabeled ones and stops learning more rules once the accuracy falls below a threshold. This learning procedure is shown in Algorithm 1 in FIG. 9.

Candidate Rule Ranking. CORNET first assigns scores to rules for each format separately and combines and ranks them later. Rules for different formats must be disjoint with respect to the given column. Combined rules are ranked by the highest total score.

This section describes how to assign scores to rules rf for one format. Rules can be ranked based, e.g., on output features or rule features. The CORNET neural ranker combines information from both. Information about the rule is captured by handpicked features. Information about the column data is captured by turning it into a sequence of words and using a pre-trained language model to obtain cell-level embeddings. These embeddings are augmented with information about the execution of the rule through cross-attention. Both vectors of information are merged by concatenating them and learning weights that produce a single score. This score thus combines both syntactic (rule) and semantic (data and execution) information. Using simple heuristics such as "choose the shortest rule that matches user examples" does not necessarily work. For example, in FIGS. 7A and 7B, the gold rule is longer than other candidates consistent with the user's examples. The gold rule corresponds to shaded cells in the Figures; "gold" cells are shaded cells such as RW-187, RW-159, RW-174, RW-195, and RW-160. ("RW" is an example data string, not presented here as an acronym for any technological component of an embodiment).

Figure 8:
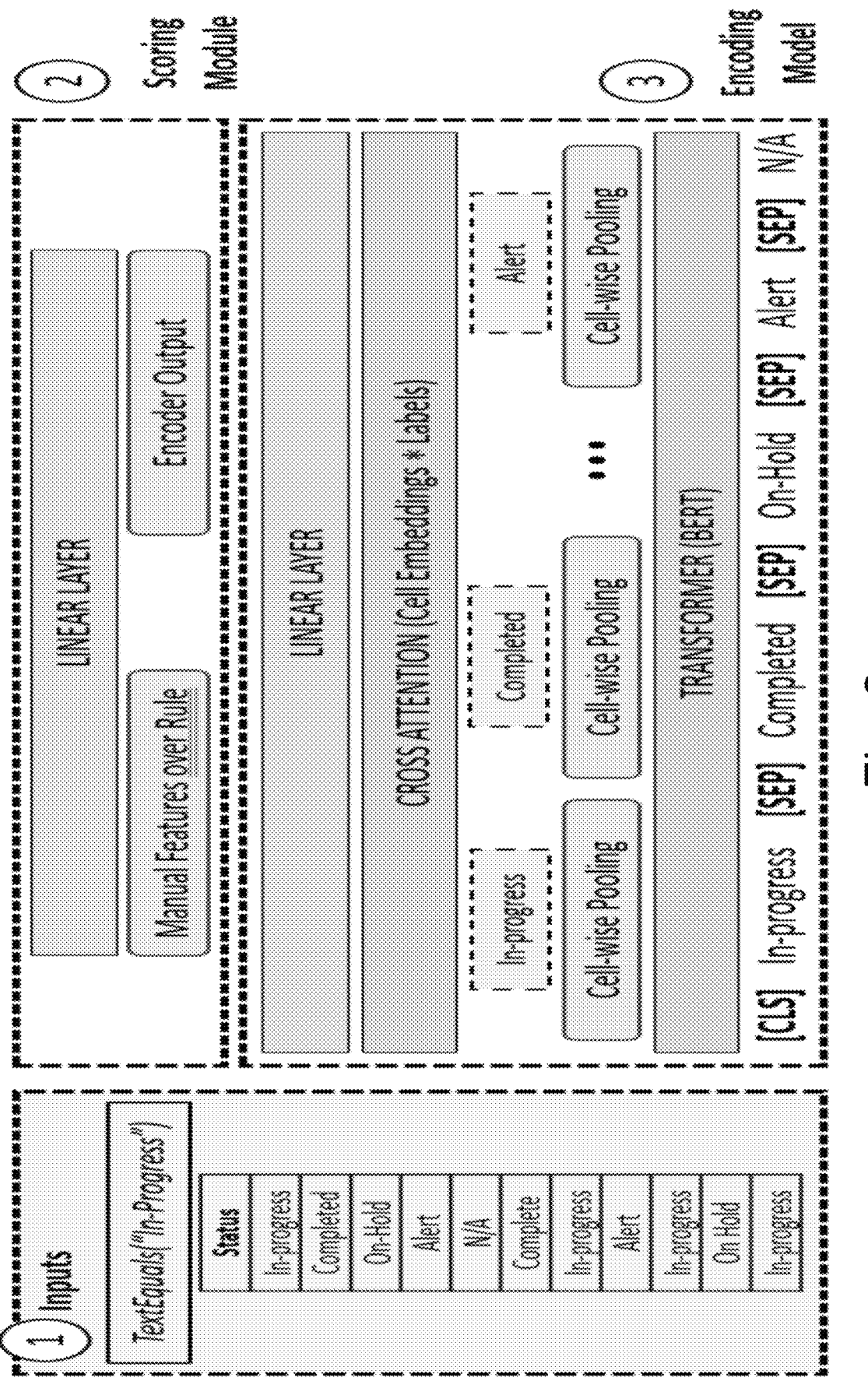
FIG. 8 is a diagram illustrating a machine learning ranking model architecture.

FIG. 8 shows an overview of the CORNET ranker. In the FIG. 4 ranking model architecture: circled 1 indicates inputs to the model are the data column and the rule to be scored; circled 2 indicates the column encoding model pools BERT token embeddings, passes them through cross attention with the rule's execution outputs (i.e. formatted or not), and then through a linear layer; and circled 3 indicates the resulting embedding is concatenated with manually-engineered rule features and fed into a final linear layer which outputs the score after applying a sigmoid activation.

The CORNET ranker model is trained by treating the ranking problem as binary classification (e.g., whether a rule candidate matches the gold CF rule) and using the output of the final activation as the score. Training data is generated by using CORNET up to rule enumeration on a held-out dataset of columns with conditional formatting. An approach provides 1, 3 or 5 examples and only keeps rules that do not match the gold as negative samples. Additionally, the approach applies gold rules on other columns to obtain both positive (by construction) and negative (by the procedure above) examples. All gold rules in this dataset are also used. This process results in approximately 3500 examples for the model.

Evaluation. The team performed experiments to answer the following questions: Q1. How does CORNET compare to baselines? Q2. How does the input table configuration affect learning? Q3. How do design decisions impact effectiveness?

Components built to evaluate CORNET include a benchmark, evaluation metrics and baselines.

Benchmark. To evaluate CORNET, the team created a benchmark by crawling 22,000 publicly available Excel® workbooks from the web. Among these, 2,500 workbooks contain at least one CF rule added by users, from which the team extracted 10,000 CF rules and their corresponding cell values and formatting. After removing duplicates and restricting to rules that operate on at least five cells and format at least two of them, the team retained 968 tasks. Table 3 shows a summary of the benchmark:

| Type | Rules | # Cells | # Formatted | Rule Depth |
|------|-------|---------|-------------|------------|
| Text | 586 | 54.8 | 17.1 | 2.1 |
| Numeric | 329 | 72.6 | 25.0 | 1.7 |
| Date | 53 | 28.9 | 10.4 | 1.8 |
| Total | 968 | 59.5 | 19.4 | 1.9 |

Table 3 shows a summary of rules in the benchmark with number of rules, average number of cells, average number of formatted cells, and depth of CF rule (by parsing into the grammar). Text rules are the most popular, followed by numeric then date.

Evaluation Metrics. The team considered two metrics: exact match and execution match. Exact match is a syntactic match between a conditional rule candidate and the gold rule, with tolerance for differences arising from white space, alternative argument order, and a set of basic semantics-preserving rewrite rules. Execution match consists of executing a rule and comparing the produced formatting to the gold formatting—there is an execution match if the two formatting results are identical. This distinction between exact and execution match is also made in related areas, such as natural language to code.

Baselines. As existing systems did not target CF directly, the team adapted as baselines a variety of symbolic and neural systems designed for general classification or table tasks. The team implemented six symbolic and three neural baseline approaches.

Three decision tree approaches fit a standard decision tree, treating user (un)formatted cells as (negative) positive labels, respectively. Numeric and datetime columns are fed directly into the decision tree, while text columns are encoded using an ordinal label encoder. In variants, a tool learns a decision tree over the generated predicates (P) and adds the ranker. The team noted the best performance across hyper-parameters.

Another approach uses an inductive logic programming (ILP) tool by casting CF rules as an ILP problem over the same space of rules as CORNET. Similar to the decision tree baseline, this approach considers raw column values as well as representing these with generated predicates.

In another approach, learning CF rules is treated as a constrained clustering problem. COPKMeans (constrained k-means) is a k-means based clustering strategy that supports linkage constraints for clusters.

Another approach uses three neural table encoders that are trained for different objectives. TAPAS (Table PArSing) is a BERT (Bidirectional Encoder Representations from Transformers) model trained to answer questions over tables, TUTA (Table Understanding with Tree-based Attention) is a tree-based transformer, pre-trained (as one of its objectives) for cell type classification and TaBERT (Table BERT) is an encoder trained to summarize table information. A custom neural baseline approach uses cell level embeddings and a cross attention over formatted and unformatted cells (detailed architecture in the appendix). Starting from pre-trained versions, this approach further trains the models on a collection of 50,000 CF rules that are synthetically generated by randomly formatting cells in unformatted columns and using CORNET to learn CF rules. This approach fine-tunes on a held-out set of 1650 gold user-written CF rules that were not used for creating benchmarks. Since these models only predict whether a cell is formatted or not, they are evaluated only on execution match.

As to Q1 (How does CORNET compare to baselines?), CORNET outperforms both symbolic and neural baselines using both rule and execution match metrics. CORNET is also able to learn CF rules with fewer examples than baselines. Although CORNET consistently learns better rules than the symbolic baselines, sometimes the neural baselines succeed while CORNET fails. This happens when CORNET is given very few examples, and as a result, its learning procedure does not generalize to a more complex rule. For example, to learn a rule with OR CORNET requires at least 2 formatted examples. Furthermore, unlike neural models that can color cells arbitrarily, CORNET is bound by a grammar. Because the grammar captures common CF patterns, CORNET may not support scenarios that require arbitrary spreadsheet formulas. However, such cases are rare in practice (11 such cases in the benchmark).

Execution versus exact match. Additional analysis revealed that in 56% of the cases where CORNET's generated rules matched in execution, but were not an exact match, the user-written rules could be simplified. To explore CORNET's potential to simplify user rules, the team created a dataset of one thousand CF rules, randomly sampled from the held-out data used to fine tune neural baselines. The team found that CORNET can simplify 117 rules by using fewer predicates. Two examples showing CORNET's ability to generate simpler rules equivalent to the user's rules are shown below. In each example, one rule is user-written and the other (shorter) rule is CORNET-generated. Selected cells of a column of data are indicated in the examples below by bold italics (in the Figures, selected cells are shaded).

Rule Simplification Example A

| Product ID |
|------------|
| *AD-134(M)* |
| FR-181 |
| *MD-23(M)* |

-continued

| Product ID |
| --- |
| GW-654 |
| SR-237 |

User-written: ISNUMBER(SEARCH("(M)", C))
CORNET-generated: TextContains("(M)")

Rule Simplification Example B

| F Name |
| --- |
| Bailey |
| Brad |
| Brianne |
| *Sarah* |
| *Shawn* |

User-written: IF(LEFT(C, 1)="S", TRUE, FALSE)
CORNET-generated: TextStartsWith("S")

As to Q2 (How does the input table configuration affect learning?), CORNET's performance varies with the number of formatted examples and unformatted cells. CORNET has higher accuracy for Text and DateTime columns. Numeric columns need more examples to converge to the correct rule, given the larger search space. The convergence rates vary significantly per column type. For example, the performance growth diminishes for Text after 2 examples, but steadily increases for Numeric even after 14 examples. This is because numeric rules are harder to learn (the numeric value can be anything from a cell value, an aggregated value, or a constant). Being aware of such differences permits an enhanced tool to proactively suggest text rules after a couple of examples, whereas for numeric rules some embodiments are more conservative.

When deploying systems like CORNET data availability might be restricted (e.g., in browsers or on mobile devices). In practice, a spreadsheet or other data to be formatted often includes significantly more unformatted cells than formatted examples. CORNET testing results show that performance growth stabilizes after 30 unformatted cells. Most browsers have at least 30 cells in their view.

As to Q3 (How do design decisions impact effectiveness?), ablation study of the impact of design decisions on effectiveness show that different components of CORNET (clustering, use of positional information through soft negative examples, iterative rule enumeration through repeated tree learning, and neuro-symbolic ranker) contribute substantially to its performance.

Clustering and Iterative Rule Enumeration. The team compared CORNET with three ablated versions (1) without clustering, (2) without iterative rule enumeration, and (3) without either. The approach without iterative rule enumeration first enumerates trees but only extracts a rule from the tree with the highest accuracy on the extended labels (see Algorithm 1). Clustering and rule enumeration have the highest impact on performance, demonstrating the value of an output-oriented synthesis procedure and use of iterated tree learning to produce multiple viable rule candidates (which are then disambiguated by the ranker).

Hard versus Soft Examples. The team compared the performance of CORNET with: (a) no negative examples, and (b) treating all negative examples as hard constraints. Performance drops in both cases. Intuitively, negative examples capture positional information associated with a top-down filling order in columns which is beneficial information for CORNET. However, treating negative examples as hard constraints can lead to overfitting, and thus negative examples should be treated as soft constraints.

Neural versus Symbolic Ranker. The team compared CORNET's neuro-symbolic ranker with two ablated versions (1) a pure symbolic ranker obtained by keeping only the handpicked features and removing the column encoding module, and (2) a pure neural ranker obtained by replacing the hand-picked features with a CodeBERT (Code BERT) encoding of the CF rule.

CORNET's ranker outperforms the symbolic and neural ablations across all Top-k configurations. Furthermore, the execution match accuracy gap between CORNET's Top-1 and the oracle ranker (TopAll) is around 6% suggesting that future work should focus on improving rule enumeration, rather than rule ranking.

CORNET targets value-based formatting of cells and also generates their associated formatting rules. CORNET uses a program-by-example (PBE) paradigm. CORNET first hypothesizes the outputs (cell formats) and then learns the associated rule. CORNET takes an "output-first" synthesis approach; in this case output space is much smaller than program space. CORNET targets the task of learning table formatting rules from examples.

CORNET experiments and studies were carried out on Python® software (version 3.8.7) (mark of the Python Software Foundation). The system used to run the experiments uses an Intel Core i7 processor (base at 1.8 GHz) along with a K80 GPU, a 64-bit operating system, and 32 GB RAM.

Predicate Generation. Experimentation used constants to concretize the predicates as explained in Table 2. For text rules, these constants come from two sources, (1) tokens from delimiter splits of cell values (splits are on case change, alphabet to numeric and vice-versa, and non-alphanumeric delimiters); (2) substrings from a character level trie on the entire column (take the 20 most-common substrings). For numeric rules, these constants come from three sources (1) Column values; (2) Statistic constants: mean, median, min, max and percentiles (10, 20 . . . 90); (3) Common constants based on analysis in Table 4 (0, 1, 50, 10 to the n). For date-time rules, these constants are derived from column values.

Table 4 summarizes an analysis of common arguments used in numeric CF Rules over a corpus of 20K Excel® workbooks (mark of Microsoft Corporation). Table 4 shows that 0, 1, 50, and 10 to the n are the most popular constants used:

| Value | Number |
| --- | --- |
| 0 | 1034 |
| 1 | 321 |
| 10 to the n | 721 |
| 50 | 109 |
| 75 | 68 |
| 85 | 93 |
| Quantiles | 506 |
| Mean | 482 |
| Max | 232 |
| Min | 128 |

Semi-supervised Clustering. Distance between two cells is the size of the symmetric difference between the sets of predicates that hold for either cell. For calculating cluster distance to a cell, use the following function:

$$wv^*(\min(dv)+\max(dv)) \qquad (1)$$

where wv is the weight of the cluster and dv is the set of distances of v from all cells in the cluster. CORNET uses a weight of 2 for negative and latent clusters and a weight of 1 for the positive cluster. The algorithm is run for 10 iterations or until the clusters stabilize (whichever occurs first). This clustering approach works well in practice, and is based on the intuition to assign latent labels based on some measure of closeness to user examples and soft negative examples. However, other metrics could be used to replace the combination of min/max distances.

Table 5 shows hyper-parameter ranges tried for tuning Decision Tree. For example, maximum depth tried was from 1 till 10 with an increment of 1 between trials:

| Hyper-parameter | Range |
|---|---|
| Maximum Depth | 1 to 10 by 1 |
| Min Samples to Split Leaf | 2 to 10 by 1 |
| Positive Class Weight | 1 to 10 by 1 |
| Minimum Impurity Decrease at Split | 0 to 1 by 0.1 |
| Complexity Parameter for Pruning | 0 to 1 by 0.1 |

Candidate Rule Enumeration. The accuracy threshold ($\lambda a$) used in this work is 0.8. The maximum number of nodes threshold ($\lambda n$) used in this work is 10. For $\lambda a$, the team tried values from 0.5 till 0.95 with an increment of 0.05. For $\lambda n$ the team tried values from 2 to 20 with increments of 2. The chosen values were found to be the best performing.

Candidate Rule Ranking CORNET's ranker combines information from the rule via handpicked features, and the execution data via column encodings. The hand-picked features used by the ranker are—depth of the rule in the grammar, mean length of arguments, percentage of column colored on execution, accuracy on clustered labels, predicate used, datatype of column, length of column. The cell values are tokenized and embedded by using BERT (CharBERT (Character BERT) was found to perform comparably). The BERT token embeddings are pooled cell-wise and all [SEP] and [CLS] tokens are dropped. The cross attention takes queries (Q) from the column cell embeddings; and keys (K) and values (V) from the rule execution (i.e., formatted or not). The cross attention first linearly projects Q, K and V into the embedding dimension (Column Length×Embedding Size (756)). The linear layer project each output cell embedding to a single value resulting in a vector of size (1× Column Length). The hand-picked features are concatenated to the linear layer output from the column and the combined vector is passed through a final linear layer which gives a single value after applying sigmoid activation. This is treated as the ranking score for the rule.

Decision Tree. The team implemented a standard decision tree, treating formatted examples as positive labels and unformatted cells of the column as negative labels, respectively. Numeric and datetime columns are fed directly into the decision tree, while text columns are encoded using an ordinal label encoder. The team explored two variants of this baseline: (1) use CORNET's predicates as features, and (2) use CORNET's predicates along with CORNET's ranker to score features. The best performance across hyper-parameters is reported.

Popper-ILP. Popper requires examples (both positive and negative) along with a grammar specified as background knowledge to learn the best program satisfying the examples from the grammar. To evaluate Popper on this task the team considered two variants. First, directly provide raw column values and the grammar is same as the one used by COR-NET. Second, use the predicate matrix P to provide pre-populated predicates to Popper and the grammar is simply a DNF (disjunctive normal form) over these predicates. For both these systems, the maximum rule depth was set to 5 and all optional parameters including direction of predicates, head and body were given as per the grammar. Each rule learning instance had a timeout of 120 seconds.

COP-KMeans. COP-KMeans is a semi-supervised clustering technique. It takes the input feature matrix F and the number of clusters m along with Must-Link Cm and Cannot-Link Cc constraints to divide the data into Cm clusters. To evaluate COP-Kmeans on this task, provide the Predicate feature Matrix P as the features and set the number of clusters to 2 (formatted and unformatted). The formatted examples and the implicit negative examples are used to populate Cm and Cc. Basically, all formatted cell pairs are in Cm along with all negative cell pairs. Cc contains all pairs between formatted and negative cells.

TAPAS. TAPAS is a table encoding model trained for SQA. It has been evaluated on this task by using it to encode the input column and the formatted cells separately. The encoded column and formatted cells are fed into a cross attention layer which then sends it to a linear layer that converts the attention output into the format prediction (Column Length×1).

TUTA. TUTA is a tree-based transformer model that can be pre-trained for multiple table-based objectives. One of the downstream tasks it has been pre-trained for is Cell type classification (CTC). TUTA for CTC considers cell values in a table along with their position, data type and formatting information to predict the role of a cell. The number of classes can be set based on the task, the team set it to 2 for formatted and unformatted cells. For this task, the team fine-tuned the CTC TUTA model on CF Data.

Figure 12:
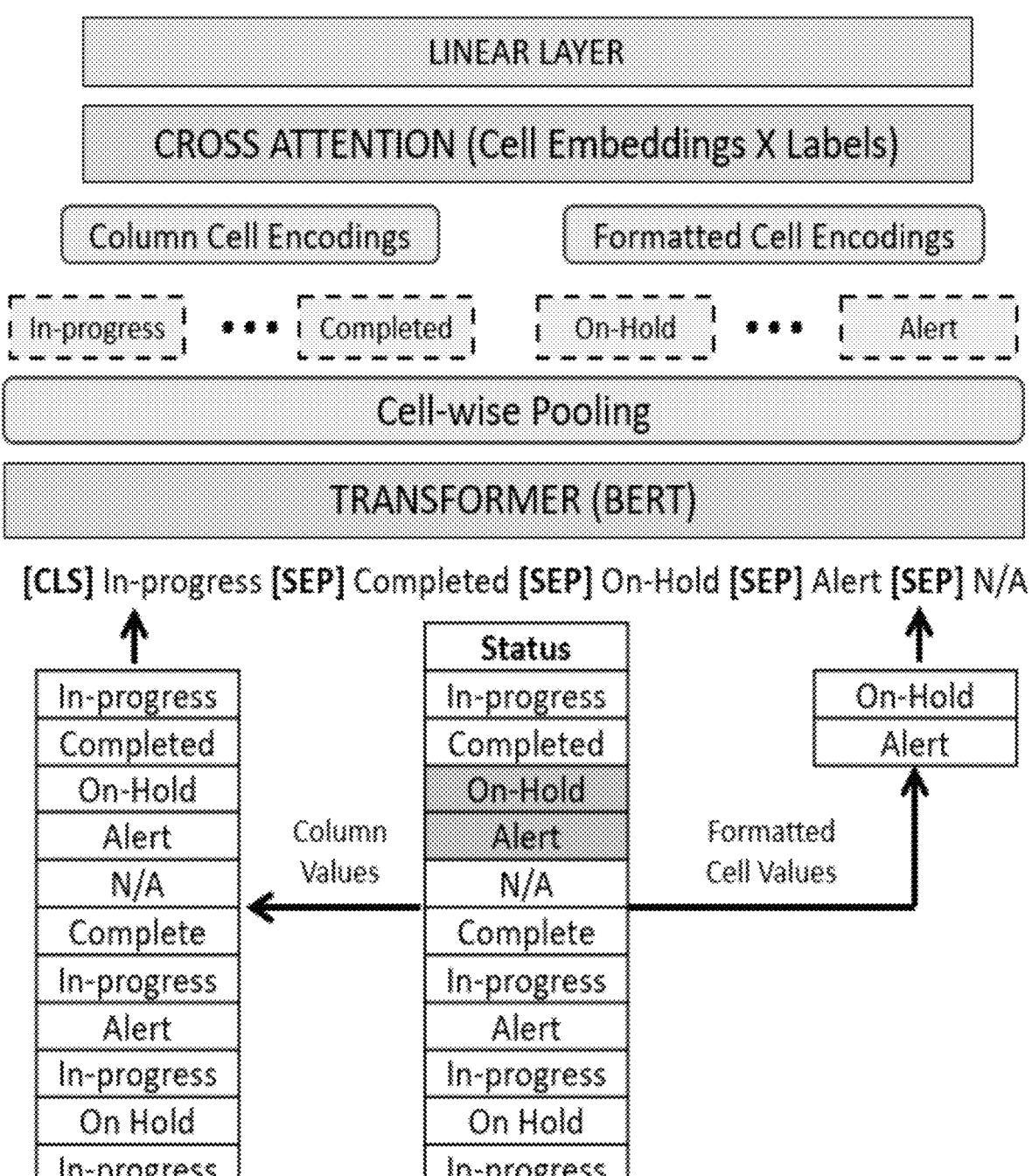
FIG. 12 is a diagram illustrating a machine learning neural baseline architecture.

Custom Neural Baseline. A custom neural architecture is illustrated in FIG. 12. The neural model encodes a column by creating an input string which contains cell values separated by [SEP] tokens. This is converted to tokens via BERT base model and cell-wise mean pooling is applied such that each cell has one embedding vector (1×V). The column and set of formatted cells are encoded separately and are fed into a cross attention layer where the full column provides the queries (Q) and the formatted cells provide the Keys (K) and Values (V). Finally, a linear layer is applied which converts the output of the attention layer (Column Length×V) to the format prediction (Column Length×1).

Synthetic Data Generation. This section provides a process for generating synthetic data for training the neural baselines. Begin by sampling columns from spreadsheets that may or may not have formatting or CF Rules. Consider columns that have at least 10 non-empty cells. For numeric columns, randomly pick a value and generate a greater than, equals and less than rule. Follow a similar approach for date-time columns by splitting it into day, month, year and weekday. For text columns, randomly select 3 cells as formatted examples and use CORNET to learn CF Rules for the column. The top-3 rules are used as synthetic data samples. Rules that color the entire column or only color a single cell are dropped. Following this procedure on 2000 Excel® workbooks containing 15000 columns yielded about 50000 synthetic CF Rule samples used to train the neural baselines.

CORNET performs better than baselines. One reason for the better performance of CORNET is that it uses a programmatic vocabulary of predicates to hypothesize formattings (unlike neural systems that color cells arbitrarily) and considers multiple candidates, ranking them based on the column and the rule. Although CORNET performs consistently better than symbolic baselines there are cases when it fails against neural baselines. This happens when CORNET is given very few examples and it fails to generalize to a more complex rule. One reason that CORNET fails to learn an optimal rule is that it is bound by a grammar and fails to generalize to a more complex rule unless more evidence is provided. Since CORNET's grammar is designed to capture common CF patterns, CORNET may not support scenarios that require arbitrary formatting formulas. However, such cases are rare in practice (11 such cases in the benchmark). Neural models like TUTA on the other hand do not follow a grammar and can produce arbitrary formatting based on semantic association between cell values.

Rule Convergence. The variation in performance of COR-NET with varying number of formatted examples was studied. An aim of this experiment was to find out how CORNET improves its performance as more formatted examples are given. It was observed that the performance converges as more formatted examples are provided, but the rates of convergence varied significantly across datatypes. For text, the performance growth diminishes after just 2 examples while for numeric columns it steadily increases till 14 examples. This behavior is expected when taking into consideration that numeric rules are harder to learn because of an infinite search space and limited relational information between values.

Controlling Unformatted Cells. An aim of this experiment is to understand the effect of reducing the number of unformatted cells on the performance of CORNET. This is interesting because CORNET may be employed in settings with restrictions on the amount of user data that is available (e.g., browser, mobile devices). For this experiment, performance of CORNET was studied with increasing number of unformatted examples. Testing started with just 1 unformatted cell and went all the way up to 100. This was done for 1, 3 and 5 formatted examples. For all cases, the performance begins to stabilize with 30 unformatted examples, which is within the limit of view for most browsers and mobile devices. This shows that CORNET requires unformatted examples for learning CF Rules but after about 30 such examples, their effect on the performance becomes insignificant.

Learning simpler rules than the gold rules. An analysis of CORNET's performance on the benchmarks revealed that 56% of cases where CORNET got the execution match but missed the exact rule match are cases where CORNET learns a simpler version of the user rule. Both the user entered rules and the CORNET predicted rules are equivalent, but the predicted version is a simpler rewrite of the rule.

Sheets w/Formatting but no CF Rules. In some cases, the user had manually formatted the spreadsheet and CORNET was able to learn a rule producing an execution match. To study the potential of CORNET for inferring CF Rules from formatted sheets, the team sampled 10,000 Excel® workbooks, resulting in 56,000 columns. The team created a dataset of 1,100 columns which contain at least 5 non-empty cells and at least 3 formatted cells. This experiment considered only cell fill color. The team divided columns based on the percentage of cells that are formatted and used CORNET to learn CF Rules. The first three formatted cells are given as formatted examples to the learner and the rest of the column is marked as unformatted. The results indicate that CORNET can learn rules for arbitrarily formatted columns with stable performance across different coloring ranges.

In some embodiments, rule discoverability is improved by monitoring user-directed actions, generating a rule consistent with them, and offering the user either the text of the rule itself, or a utilization of the rule. In some, rule discovery is implemented by generating a rule and then coloring cells that match the rule's predicates, or otherwise making a result of rule utilization visible in a user interface. A user may also be notified, before or during or after, that the enhanced tool generated and applied a rule. In some embodiments, rule discovery occurs when an enhanced tool offers to simplify an existing rule. Some rules are syntactically correct but could be shorter.

Technical Character

The technical character of embodiments described herein will be apparent to one of ordinary skill in the art, and will also be apparent in several ways to a wide range of attentive readers. Some embodiments address technical and computational activities such as formatting 1012 data, filtering 1014 data, validating 1016 data, autogenerating 1002 data processing rule predicates 304, clustering 1004 cells 132, and ranking 1008 candidate rules 208, which are each an activity deeply rooted in computing technology. Some of the technical mechanisms discussed include, e.g., predicate generators 306, cluster creators 310, rule rankers 312, rule enumerators 314, user interfaces 124, and enhanced tools 134 and systems 202. Some of the technical effects discussed include, e.g., autogenerated data processing rules 208 based on examples 214, shortened versions of existing rules 208, and surfacing of rule generation 210 functionality in a user interface 124. Thus, purely mental processes and activities limited to pen-and-paper are clearly excluded. Other advantages based on the technical characteristics of the teachings will also be apparent to one of skill from the description provided.

Different embodiments provide different technical benefits or other advantages in different circumstances, but one of skill informed by the teachings herein will acknowledge that particular technical advantages will likely follow from particular innovation features or feature combinations, as noted at various points herein.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to help users discover data formatting functionality in a spreadsheet, and how to improve the efficiency and consistency of spreadsheet data formatting. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

ACRONYMS, ABBREVIATIONS, NAMES, AND SYMBOLS

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Data processing rule generation operations such as generating 1002 rule predicates 304, creating 1004 cell 132 clusters 308, enumerating 1006 rules 208 based on clusters 308, and many other operations discussed herein, are understood to be inherently digital. A human mind cannot interface directly with a CPU or other processor, or with RAM or other digital storage, to read and write the necessary data to perform the data processing rule generation steps 1100 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein.

Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as applying, autogenerating, clustering, coloring, creating, displaying, employing, encoding, enumerating, feeding, filtering, fitting, formatting, generating, identifying, inferring, obtaining, outputting, processing, ranking, selecting, treating, utilizing, validating (and applies, applied, autogenerates, autogenerated, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"

104 users, e.g., user of an enhanced system 202

106 peripheral device 108 network generally, including, e.g., LANs, WANs, software-defined networks, clouds, and other wired or wireless networks 110 processor; includes hardware 112 computer-readable storage medium, e.g., RAM, hard disks 114 removable configured computer-readable storage medium 116 instructions executable with processor; may be on removable storage media or in other memory (volatile or nonvolatile or both)

118 digital data in a system 102; data structures, values, software, artifacts, and other examples are discussed herein 120 kernel(s), e.g., operating system(s), BIOS, UEFI, device drivers 122 spreadsheet, editor, viewer, browser, or other software tool; may be a locally installed application, or be provided as software-as-a-service, or be otherwise implemented for use on a system 102

124 user interface, e.g., of a tool 122 or kernel 120 in a system 102; software and hardware 126 display screens, also referred to as "displays"

128 computing hardware not otherwise associated with a reference number 106, 108, 110, 112, 114

130 spreadsheet, as represented in a system 102

132 spreadsheet cell or other table cell, as represented in a system 134 spreadsheet tool in a system 102

136 cloud, also referred to as cloud environment or cloud computing environment 202 enhanced computing system, i.e., system 102 enhanced with data processing rule generation functionality 212

204 machine learning, as implemented or otherwise represented in a system 202

206 data processing, e.g., computational activity with reads or writes or otherwise applies processing 110 to data 118 in a system 202

208 data processing 206 rule, as implemented or otherwise represented in a system 202

210 automated generation of a data processing rule, also referred to herein as autogeneration or generation, namely, computational activity with creates or modifies a data processing rule 212 functionality for rule autogeneration 210 as taught herein; e.g., software or specialized hardware which performs or is configured to perform steps 1002 and 1004 and 1006, or step 1104, or step 1110, or any software or hardware which performs or is configured to perform a method 1100 or a computational rule 208 production activity first disclosed herein 214 example data 118 utilizable as input for rule autogeneration 210, e.g., data which will satisfy a rule predicate 304 or a rule 208

216 data 118 filtered, formatted, validated, or otherwise processed by a generated 210 rule 208

302 rule generation software, e.g., software which upon execution by a processor set performs a method 1100 or provides functionality 212

304 rule predicate, as represented in a system 202

306 rule predicate generator, as implemented or otherwise represented in a system 202

308 cell cluster, as represented in a system 202

310 cell cluster creator, as implemented or otherwise represented in a system 202

312 rule or rule predicate ranker as implemented or otherwise represented in a system 202

314 rule enumerator, as implemented or otherwise represented in a system 202

316 user-written rule 208, as represented in a system 202

318 interface generally 402 conditional data formatting rule 208, as represented in a system 202

404 data formatting rule 208 (whether conditional on data being formatted, or otherwise), as represented in a system 202

406 data filtering rule 208, as represented in a system 202

408 data validating rule 208, as represented in a system 202; rules that dictate what data in a column (or any column) is valid, for example, "between(1,100)" is a data validation rule that says valid column values are between 1 and 100

412 suggestion to apply a rule 208, as implemented or otherwise represented in a system 202; discussion herein presumes suggestion 412 has been or will be or is being visually presented to a user via a user interface 124

414 encoding of a rule 208 or portion thereof, as implemented or otherwise represented in a system 202

416 column or row of data 118 spreadsheet 130 or other table data structure in a system 202

418 encoding of a column 416 or row 416 or portion thereof, as implemented or otherwise represented in a system 202

420 rank of a rule or rule predicate ranker as implemented or otherwise represented in a system 202

1000 flowchart; 1000 also refers to processing rule 208 generation methods that are illustrated by or consistent with the FIG. 10 flowchart

1002 computationally select, identify, or otherwise generate a rule predicate based at least in part on at least one example 214

1004 computationally select, identify, or otherwise create a cell cluster based at least in part on at least one rule predicate

1006 computationally select, identify, or otherwise enumerate a rule based at least in part on at least one cell cluster

1008 computationally score or otherwise rank a rule

1010 computationally employ a rule in a system 102, e.g., by formatting, filtering, or validating data based on at least the rule

1012 computationally format data in a system 102

1014 computationally filter data in a system 102

1016 computationally validate data in a system 102

1100 flowchart; 1100 also refers to processing rule 208 generation methods that are illustrated by or consistent with the FIG. 11 flowchart (which incorporates the FIG. 10 flowchart)

1102 computationally obtain a rule, e.g., via an API

1104 computationally infer a rule, e.g., in the absence of any user-written rules

1106 computationally output a rule, e.g., via an API

1108 computationally display a suggestion 412, e.g., via a user interface

1110 computationally identify a substitute rule, e.g., by comparing predicate counts or applying an evaluation metric

1112 computationally utilize a negative example during rule generation

1114 negative example of application of a rule, as represented in a system 202

1116 computationally fit a decision tree to column or row of data

1118 computationally treat an item 118 as a machine learning label

1120 machine learning label, as represented in a system 202

1122 computationally feed a row or column into a decision tree or other ML mechanism in a system 202

1124 computationally encode a row or column in a system 202

1126 any step or item discussed in the present disclosure that has not been assigned some other reference numeral; 1126 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments automatically generate data processing rules 208 based on positive examples of processed data, e.g., formatting 1012 rules based on formatted data, filtering 1014 rules based on filtered data, or validating s1016 rules based on valid data. Some embodiments also use negative examples, e.g., unformatted data. A machine learning rule generation architecture (e.g., FIGS. 7A, 7B) includes a predicate generator 306, a cell cluster creator 310, a rule enumerator 314, and in some versions a rule ranker 312. Formatting rules written by a user are replaced 1110 by simpler autogenerated rules. Spreadsheet tool 134 formatting rule functionality is enhanced, and surfaced in a user interface.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A neuro-symbolic machine learning computing system comprising:

a digital memory;

a processor set including at least one processor, the processor set in operable communication with the digital memory;

an executable input receiver which upon execution by the processor set receives as input a plurality of cells wherein each cell contains data and the data in the plurality of cells contains multiple properties;

an executable predicate generator which upon execution by the processor set generates a rule predicate based on at least one of the cells, the rule predicate comprising a function configured to have a cell as an input, the function configured to upon evaluation by processor execution return a true value or a false value which indicates whether the cell has a specified property which corresponds to the function;

an executable semi-supervised cluster creator which upon execution by the processor set creates a cell cluster based at least in part on the rule predicate;

an executable symbolic rule enumerator which upon execution by the processor set enumerates at least two rules using iterative learning decision trees based at least in part on the rule predicate, wherein at least a subset of the iterative learning decision trees corresponds to the at least two rules in disjunctive normal form;

an executable ranker which upon execution by the processor set ranks the at least two rules based on assigning a score to the at least two rules through cross attention and applying a sigmoid activation; and an executable output generator which upon execution by the processor set outputs at least one of the at least two rules.

2. The computing system of claim 1, wherein the executable symbolic rule enumerator upon execution by the processor set enumerates at least one of the following data processing rules:

a conditional formatting rule in which a format of a given cell is conditioned upon at least a data value in the given cell, the conditional formatting rule being a formatting rule; or a formatting rule which specifies a format of a data value in the given cell.

3. The computing system of claim 1, wherein the plurality of cells includes a first set of spreadsheet cells, and the executable symbolic rule enumerator upon execution by the processor set enumerates at least two formatting rules which format a second set of spreadsheet cells.

4. The computing system of claim 1, wherein the executable symbolic rule enumerator upon execution by the processor set enumerates a filtering rule in which a filtering result of a given cell is conditioned upon at least a data value in the given cell.

5. The computing system of claim 1, further comprising:

a spreadsheet program having a user interface, wherein the spreadsheet program is configured to obtain a rule and to display in the user interface a suggestion offering to employ the rule for at least one of: formatting data, filtering data, or validating data.

6. A method performed by computing system to facilitate processing data in cells, the method comprising:

receiving as input a plurality of cells wherein each cell contains data and the data in the plurality of cells contains multiple properties;

generating a rule predicate based on at least one cell, the rule predicate comprising a function configured to have a cell as an input, the function configured to upon evaluation by processor execution return a true value or a false value which indicates whether the cell has a specified property which corresponds to the function;

creating a cell cluster using semi-supervised clustering, based at least in part on the rule predicate, the cell cluster comprising the at least one cell and also comprising at least one additional cell;

enumerating at least two rules using iterative learning decision trees based at least in part on the rule predicate, wherein at least a subset of the iterative learning decision trees corresponds to the at least two rules in disjunctive normal form;

ranking the at least two rules based on assigning a score to the at least two rules through cross attention and applying a sigmoid activation;

performing data processing on the at least one additional cell of the cell cluster by employing at least one ranked rule of the at least two rules; and identifying a simpler rule of the at least two rules as a simpler substitute for a more complex rule of the at least two rules, the simpler rule having fewer predicates than the more complex rule or using more built-in predicates than the more complex rule, or both.

7. The computing system of claim 1, wherein the executable symbolic rule enumerator upon execution by the processor set enumerates a validating rule in which a validity characterization of a given cell is conditioned upon at least a data value in the given cell.

8. The method of claim 6, wherein performing the data processing on the at least one additional cell of the cell cluster comprises at least one of the following:

displaying in a software tool a suggestion offering to perform formatting of the at least one additional cell based on the at least one ranked rule;

in a software tool, performing formatting of the at least one additional cell based on the at least one ranked rule;

displaying in a software tool a suggestion offering to perform filtering of the at least one additional cell based on the at least one ranked rule;

in a software tool, performing filtering of the at least one additional cell based on the at least one ranked rule;

displaying in a software tool a suggestion offering to perform validating of the at least one additional cell based on the at least one ranked rule; or in a software tool, performing validating of the at least one additional cell based on the at least one ranked rule.

9. The method of claim 6, further comprising at least one of:

treating user formatted examples as positive labels and unformatted cells as negative labels; or encoding text columns using an ordinal label encoder.

10. The method of claim 6, wherein the method infers a formatting rule from formatted data cells located outside a spreadsheet.

11. The method of claim 6, wherein creating the cell cluster utilizes soft negative examples.

12. The method of claim 6, wherein enumerating the at least two rules comprises at least one of: learning a decision tree, executing an inductive logic program, or performing a brute force search.

13. The method of claim 6, further comprising at least one of the following:

fitting a decision tree to a column of cells;

feeding numeric columns directly into a decision tree; or feeding datetime columns directly into a decision tree.

14. A computer-readable storage device configured with data and instructions which upon execution by a processor cause a computing system to perform a method for producing at least one data processing rule, the method performed by a computing system, the method comprising:

receiving as input a plurality of cells wherein each cell contains data and the data in the plurality of cells contains multiple properties;

generating rule predicates based on at least one formatted cell, each rule predicate comprising a respective function configured to have a cell as an input, the function configured to upon evaluation by processor execution return a true value or a false value which indicates whether the cell has a specified property which corresponds to the function;

creating cell clustering using semi-supervised clustering, based at least in part on the rule predicates, wherein creating a cell cluster utilizes a soft negative example;

enumerating at least two rules using iterative learning decision trees based at least in part on the rule predicate, wherein at least a subset of the iterative learning decision trees corresponds to the at least two rules in disjunctive normal form;

ranking the at least two rules based on assigning a score to the at least two rules through cross attention and applying a sigmoid activation; and facilitating rule-based data processing by outputting at least one rule.

15. The computer-readable storage device of claim 14, wherein outputting the at least one rule comprises:

outputting at least one data formatting rule.

16. The computer-readable storage device of claim 14, wherein outputting the at least one rule comprises:

outputting at least one data filtering rule.

17. The computer-readable storage device of claim 14, wherein outputting the at least one rule comprises:

outputting at least one data validating rule.

18. The computer-readable storage device of claim 14, wherein the method infers a data filtering rule.

19. The computer-readable storage device of claim 14, wherein the method infers a data validating rule.

20. The computer-readable storage device of claim 14, wherein ranking the at least two rules produces a rank based on a combination of collected predicates and an encoding of a set of data.

\* \* \* \* \*